(12) United States Patent  
Choi et al.

(10) Patent No.: US 12,190,231 B2  
(45) Date of Patent: Jan. 7, 2025

(54) METHOD AND APPARATUS FOR NEURAL NETWORK QUANTIZATION

(71) Applicant: Samsung Electronics Co., Ltd., Gyeonggi-do (KR)

(72) Inventors: Yoo Jin Choi, San Diego, CA (US); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 1416 days.

(21) Appl. No.: 15/697,035

(22) Filed: Sep. 6, 2017

(65) Prior Publication Data

US 2018/0107926 A1  Apr. 19, 2018

Related U.S. Application Data

(63) Continuation-in-part of application No. 15/433,531, filed on Feb. 15, 2017, now Pat. No. 11,321,609.

(60) Provisional application No. 62/480,857, filed on Apr. 3, 2017, provisional application No. 62/409,961, filed on Oct. 19, 2016.

(51) Int. Cl.
*G06N 3/08* (2023.01)
*G06F 7/58* (2006.01)
*G06N 3/047* (2023.01)
*G06N 3/063* (2023.01)

(52) U.S. Cl.
CPC ............ *G06N 3/08* (2013.01); *G06F 7/582* (2013.01); *G06N 3/047* (2023.01); *G06N 3/063* (2013.01)

(58) Field of Classification Search
CPC .......... G06N 3/04; G06N 3/084; G06N 3/082; G06N 3/02; G06N 5/025
See application file for complete search history.

(56) References Cited

U.S. PATENT DOCUMENTS

| | | |
|---|---|---|
| 9,047,655 B2 | 6/2015 | Gross et al. |
| 9,258,564 B2 | 2/2016 | Pau |
| 9,418,458 B2 | 8/2016 | Chertok et al. |
| 9,456,131 B2 | 9/2016 | Tran |

FOREIGN PATENT DOCUMENTS

CN  105917407  8/2016

OTHER PUBLICATIONS

Han et al., Deep Compression: Compressing Deep Neural Networks with Pruning, Trained Quantization and Huffman Coding, Feb. 15, 2016 (Year: 2016).*

(Continued)

*Primary Examiner* — Ann J Lo  
*Assistant Examiner* — Charles C Kuo  
(74) *Attorney, Agent, or Firm* — The Farrell Law Firm, P.C.

(57) ABSTRACT

Apparatuses and methods of manufacturing same, systems, and methods for performing network parameter quantization in deep neural networks are described. In one aspect, multi-dimensional vectors representing network parameters are constructed from a trained neural network model. The multi-dimensional vectors are quantized to obtain shared quantized vectors as cluster centers, which are fine-tuned. The fine-tuned and shared quantized vectors/cluster centers are then encoded. Decoding reverses the process.

20 Claims, 17 Drawing Sheets

(56) References Cited

OTHER PUBLICATIONS

Zamir et al., On Universal Quantization by Randomized Uniform/ Lattice Quantizers, 1992, IEEE Transactions on Information Theory, vol. 38, No. 2, Mar. 1992 (Year: 1992).*
Dognin, Pierre et al., Combining Stochastic Average Gradient And Hessian-Free Optimization For Sequence Training Of Deep Neural Networks, 2013, IEEE ASRU 2013 pp. 321-325 (Year: 2013).*
Hassibi, Babak et al., Optimal Brain Surgeon and General Network Pruning, 1993 IEEE Int'l Conf on Neural Networks, pp. 293-299.
He, Qinyao et al., Effective Quantization Methods for Recurrent Neural Networks, arXiv:1611.10176v1 [cs.LG], Nov. 30, 2016, 10 pages.
He, Kaiming et al., Deep Residual Learning for Image Recognition, arXiv:1512.03385v1 [cs.CV], Dec. 10, 2015, 12 pages.
Lecun, Yann et al., Optimal Brain Damage, Advances in Neural Infomation Processing Systems, 1990, 8 pages.
Krizhevsky, Alex et al., ImageNet Classification with Deep Convolutional Neural Networks, Advances in neural information processing systems, 2012.
Lecun, Yann et al., Efficient BackProp, 44 pages.
Kingma, Diederik et al., Adam: A Method for Stochastic Optimization, arXiv:1412.6980v8 [cs.LG] Jul. 23, 2015, 15 pages.
Lecun, Yann et al., Deep Learning, Nature521.7553, May 28, 2015, pp. 436-444.
Lin, Darryl D. et al., Fixed Point Quantization of Deep Convolutional Networks, arXiv:1511.06393v3 [][cs.LG], Jun. 2, 2016, 10 pages.
Mallapragada, Pavan K. et al., Online Visual Vocabulary Pruning Using Pairwise Constraints, IEEE, 2010, pp. 3073-3080.
Hinton, Geoffrey E. et al., A Fast Learning Algorithm for Deep Belief Nets, Neural Computation 18, year 2006, pp. 1527-1554.
Jaderberg, Max et al., Speeding up Convolutional Neural Networks with Low Rank Expansions, arXiv:1405.3866v1 [cs.CV] May 15, 2014, 12 pages.
Kim, Yong-Deok et al., Compression of Deep Convolutional Neural Networks for Fast and Low Power Mobile Applications, arXiv:1511.06530v2 [cs.CV] ICLR 2016, 16 pages.
Lecun, Yann et al., Gradient-Based Learning Applied to Document Recognition, Proc. of the IEEE, Nov. 1998, 46 pages.
Lecun, Y. et al., Handwritten Digit Recognition with a Back-Propagation Network, Advances in Neural Infomation Processing Systems, 1990, pp. 396-404.
Tai, Cheng et al., Convolutional Neural Networks with Low-Rank Regularization, arXiv:1511.06067v3 [cs.LG], ICLR 2016, 11 pages.
Zhao, Qian et al., Multi-resolution Source Coding Using Entropy Constrained Dithered Scalar Quantization, IEEE DCC Proceedings, 2004, 10 pages.
Krizhevsky, Alex et al., ImageNet Classification with Deep Convolutional Neural Networks, Presentation slides, May 18, 2015.
Krizhevsky, Alex et al., ImageNet Classification with Deep Convolutional Neural Networks, Presentation slides matching paper in NIPS, year 2012.
Hinton, Geoffrey et al., Neural Networks for Machine Learning, Lecture 6a, Overview of mini-batch gradient descent, Presentation slides.
Taiwanese Office Action dated Mar. 25, 2021 issued in counterpart application No. 106135833, 7 pages.
Yana Le Cun et al., "Optimal Brain Damage", 1990, 8 pages.
Ming Tu et al., "Reducing the Model Order of Deep Neural Networks Using Information Theory", IEEE Computer Society Annual Symposium on VLSI, 2016, 6 pages.
Philip A. Chou et al., "Entropy-Constrained Vector Quantization", IEEE Transactions on Acoustics, Speech, and Signal Processing, vol. 37, No. 1, Jan. 1989, 12 pages.
Song Han et al., "Deep Compression: Compressing Deep Neural Networks with Pruning, Trained Quantization & Huffman Coding", Conference Paper ICLR 2016, Feb. 15, 2016, 14 pages.
Ram Zamir et al., "On Universal Quantization by Randomized Uniform/ Lattice Quantizers", IEEE Transactions on Information Theory, vol. 38, No. 2, Mar. 1992, 9 pages.
Chinese Office Action dated Aug. 5, 2023 issued in counterpart application No. 201710684586.1, 11 pages.
Chinese Office Action dated Aug. 24, 2023 issued in counterpart application No. 201710996667.5, 11 pages.
Simonyan, Karen et al., Very Deep Convolutional Networks for Large—Scale Image Recognition, arXiv:1409.1556v6 [cs.CV], ICLR Apr. 10, 2015, 14 pages.
Sun, Fangxuan et al., Intra-Layer Nonuniform Quantization of Convolutional Neural Network, arXiv:1607.02720v2 [cs.CV], Aug. 6, 2016, 5 pages.
Sung, Wonyong et al., Resiliency of Deep Neural Networks Under Quantization, arXiv:1511.06488v3 [cs.LG], ICLR Jan. 7, 2016, 11 pages.
Tu, Ming et al., Reducing the Model Order of Deep Neural Networks Using Information Theory, arXiv:1605.04859v1 [cs.LG], May 16, 2016, 6 pages.
Wang, Xing et al., Scalable Compression of Deep Neural Networks, arXiv:1608.07365v1 [cs.CV], Aug. 26, 2016, 5 pages.
Zeiler, Matthew D., Adadelta: An Adaptive Learning Rate Method, arXiv:1212.5701v1 [cs.LG], Dec. 22, 2012, 6 pages.
Alvarez, Raziel et al., On the Efficient Representation and Execution of Deep Acoustic Models, arXiv:1607.04683v2 [cs.LG], Dec. 17, 2016, 5 pages.
Choi, Yoojin et al., Towards the Limit of Network Quantization, arXiv:1612.01543v1 [cs.CV], Dec. 5, 2016, rev for ICLR 2017, 20 pages.
Chou, Philip A. et al., Entropy-Constrained Vector Quantization, IEEE Transactions on Acoustics, Speech, and Signal Processing, vol. 37, No. 1, Jan. 1989, pp. 31-42.
Duchi, John et al., Adaptive Subgradient Methods for Online Learning and Stochastic Optimizaiton, Journal of Machine Learning Research, 2011, pp. 2121-2159.
Gish, Herbert et al., Asymptotically Efficient Quantizing, IEEE Transactions on Information Theory, vol. it-14, No. 5, Sep. 1968, pp. 676-683.
Gong, Yunchao et al., Compressing Deep Convolutional Networks Using Vector Quantization, arXiv:1412.6115v1 [cs.CV], Dec. 18, 2014, ICLR 2015, 10 pages.
Han, Song et al., Deep Compression: Compressing Deep Neural Networks with Pruning, Trained Quantization and Huffamn Coding, arXiv:1510.00149v5 [cs.CV], Feb. 15, 2016, ICLR 2016, 14 pages.
Becker, Sue et al., Improving the Convergence of Back-Propagation Learning with Second Order Methods, Proc. of the 1988 Connectionist Models Summer School, Technical Report CRG-TR-88-5, Sep. 1988, 10 pages.
Denil, Misha et al., Predicting Parameters in Deep Learning, arXiv:1306.0543v2 [cs.LG], Oct. 27, 2014, 9 pages.
Du, Xianzhi et al., Fused DNN: A deep neural network fusion approach to fast and robust pedestrian detection, arXiv:1610.03466v1 [cs.CV], Oct. 11, 2016, 11 pages.
Han, Song et al., Learning both Weights and Connections for Efficient Neural Networks, Proceedings of 28th International Conference on NIPS, Dec. 2015, pp. 1135-1143.
Hassibi, Babak et al., Second order derivatives for network pruning: Optimal Brain Surgeon, Advances in Neural Infomation Processing Systems, 1993, pp. 164-171.
Conway, J.H. et al., Fast Quantizing and Decoding Algorithms for Lattice Quantizers and Codes, IEEE Transactions on Information Theory, vol. IT-28, No. 2, Mar. 1982, pp. 227-232.
Conway, J.H. et al., Voronoi, Regions of Lattices, Second Moments of Polytopes, and Quantization, IEEE Transactions on Information Theory, vol. IT-28, No. 2, Mar. 1982, pp. 211-226.
Gersho, Allen, Asymptotically Optimal Block Quantization, IEEE Transactions on Information Theory, vol. IT-25, No. 4, Jul. 1979, pp. 373-380.
Gray, Robert M., Vector Quantization, IEEE ASSP Magazine Apr. 1984, 26 pages.
Welch, Terry A., A Technique for High-Performance Data Compression, Computer, vol. 6, No. 17, IEEE, Jun. 1984, pp. 8-19.
Zamir, Ram et al., On Universal Quantization by Randomized Uniform/Lattice Quantizers, IEEE Transactions on Information Theory, vol. 38, No. 2, Mar. 1992, pp. 428-436.

(56) References Cited

OTHER PUBLICATIONS

Ziv, Jacob, et al., A Universal Algorithm for Sequential Data Compression, IEEE Transactions on Information Theory, vol. IT-23, No. 3, May 1977, pp. 337-343.
Ziv, Jacob, et al., Compression of Individual Sequences via Variable-Rate Coding, IEEE Transactions on Information Theory, vol. IT-24, No. 5, Sep. 1978, pp. 530-536.
Ziv, Jacob, On Universal Quantization, IEEE Transactions on Information Theory, vol. IT-31, No. 3, May 1985, pp. 344-347.

* cited by examiner

Network compression and decompression by ECVQ and entropy coding

Network compression and decompression by universal quantization and entropy coding

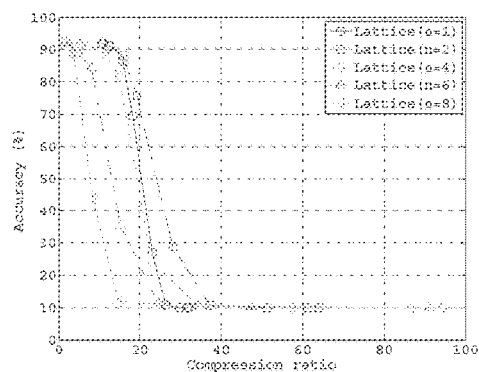
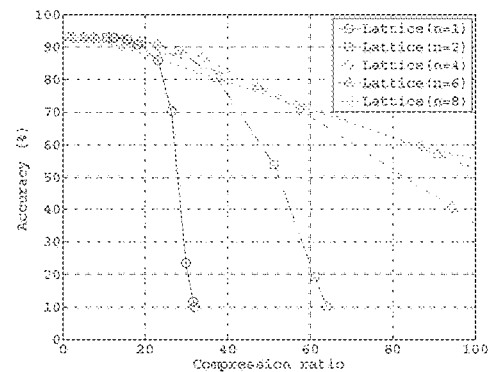

FIGS. 13A and 13B: Lattice quantization results before and after fine-tuning shared quantized vectors where uniform boundaries in each dimension are set by $[\pm \frac{1}{2}\Delta, \pm \frac{3}{2}\Delta, \ldots, \pm \frac{2^n-1}{2}\Delta, \ldots]$

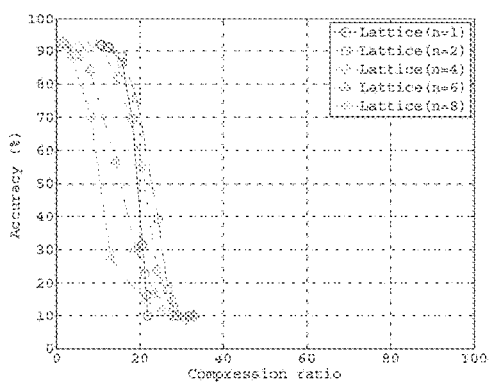
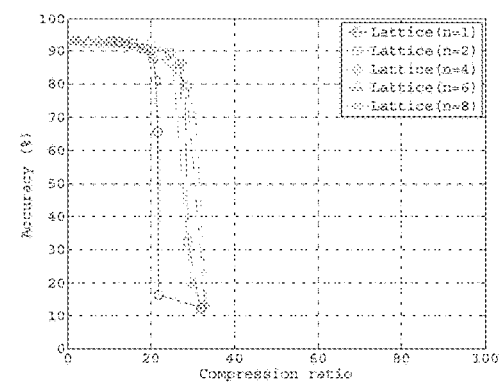

FIGS. 13C and 13D: Lattice quantization results before and after fine-tuning shared quantized vectors where uniform boundaries in each dimension are set by $[0, \pm \Delta, \pm 2\Delta, \ldots, \pm 2^n \Delta, \ldots]$

FIG. 14A
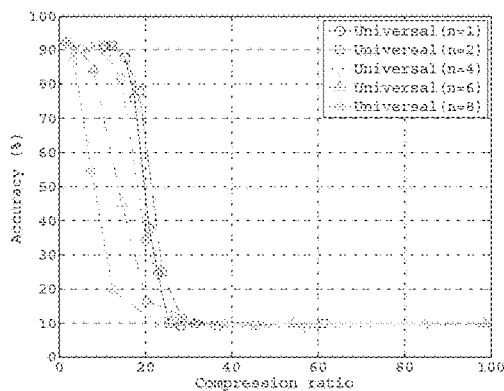
FIG. 14B
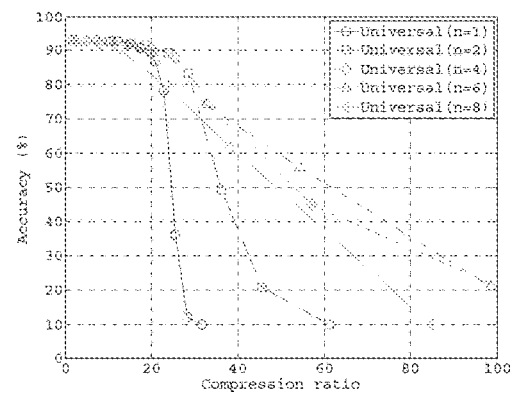
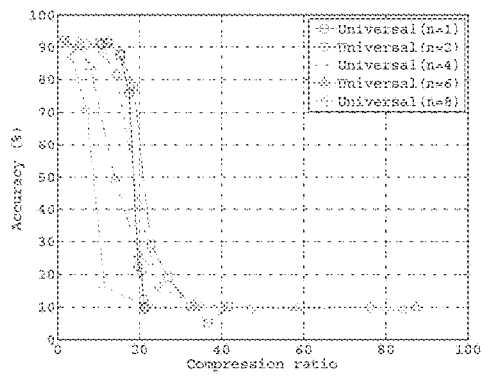
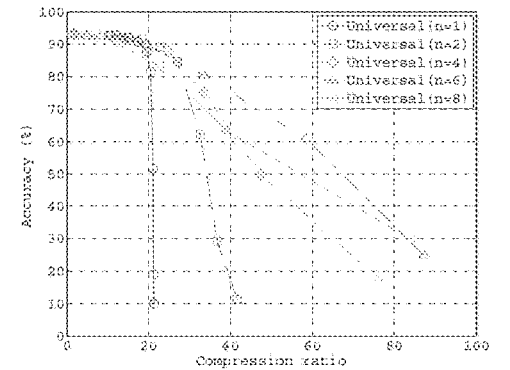
FIG. 14C
FIG. 14D

METHOD AND APPARATUS FOR NEURAL NETWORK QUANTIZATION

PRIORITY

This application is a Continuation-in-Part Application of, and claims priority to, U.S. patent application Ser. No. 15/433,531, which was filed on Feb. 15, 2017 and claimed priority under 35 U.S.C. § 119(e) to U.S. Provisional Patent Application Ser. No. 62/409,961 filed on Oct. 19, 2016, and also claims priority under 35 U.S.C. § 119(e) to U.S. Provisional Patent Application Ser. No. 62/480,857 filed on Apr. 3, 2017, the entire contents of all of which are incorporated herein by reference.

FIELD

The present disclosure relates generally to deep neural networks, and more particularly, to a method and apparatus for neural network quantization.

BACKGROUND

Machine learning technology is continually evolving and has come to support many aspects of modern society, from web searches, content filtering, automated recommendations on merchant websites, automated game playing, to object detection, image classification, speech recognition, machine translations, and drug discovery and genomics. The current state of the art in the field of machine learning are deep neural networks, which use computational models composed of multiple processing layers which learn representations of data (usually, extremely large amounts of data) with multiple levels of abstraction—hence, the terminology "deep learning", "deep networks," etc. See, e.g., LeCun, Vann, Yoshua Bengio, and Geoffrey Hinton. "Deep learning," Nature, vol. 521, pp. 436-444 (28 May 2015), which is hereby incorporated herein by reference in its entirety.

The first, and most important stage in machine learning is training. Consider a machine learning system for the classification of images. A large data set of images of, e.g., people, pets, cars, and houses, is collected, each labelled with a corresponding category. During training, the machine is shown an image and produces an output in the form of a vector of scores, one for each category. The end goal is for the correct category to have the highest score of all categories, but this is unlikely to happen before training. An objective function that measures the error (or distance) between the output scores and the desired pattern of scores is used in training. More specifically, the machine modifies its internal adjustable parameters to reduce the error calculated from the objective function. These adjustable parameters, often called weights, are what define the input-output function of the machine. In a typical deep-learning system, there may be hundreds of millions of such adjustable weights/parameters, and hundreds of millions of labelled examples with which to train the machine.

To properly adjust the weight vector, the learning algorithm computes a gradient vector that, for each weight, indicates by what amount the error would increase or decrease if the weight were increased by a tiny amount. The weight vector is then adjusted in the opposite direction to the gradient vector. The objective function, averaged over all the training examples, can be visualized as a kind of hilly landscape in the high-dimensional space of weight values. The negative gradient vector indicates the direction of steepest descent in this landscape, taking it closer to a minimum, where the output error is low on average. In practice, a procedure called stochastic gradient descent (SGD) is typically used. This consists of showing the input vector for a few examples, computing the outputs and the errors, computing the average gradient for those examples, and adjusting the weights accordingly. The process is repeated for many small sets of examples from the training set until the average of the objective function stops decreasing. It is called stochastic because each small set of examples gives a noisy estimate of the average gradient over all examples. This simple procedure usually finds a good set of weights surprisingly quickly when compared with far more elaborate optimization techniques. After training, the performance of the system is measured on a different set of examples called a test set. This serves to test the generalization ability of the machine its ability to produce sensible answers on new inputs that it has never seen during training.

As mentioned above, there may be hundreds of millions of network parameters/weights which require a significant amount of memory to be stored. Accordingly, although deep neural networks are extremely powerful, they also require a significant amount of resources to implement, particularly in terms of memory storage. See, e.g., Krizhevsky, Alex, Ilya Sutskever, and Geoffrey E. Hinton. "Imagenet classification with deep convolutional neural networks." Advances in neural information processing systems 2012 (having 61 million network parameters) and Simonyan, Karen, and Andrew Zisserman, "Very deep convolutional networks for large-scale image recognition," arXiv preprint arXiv: 1409.1556 (2014) (having 138 million network parameters), both of which are hereby incorporated herein by reference in its entirety.

This makes it difficult to deploy deep neural networks on devices with limited storage, such as mobile/portable devices.

SUMMARY

Accordingly, the present disclosure has been made to address at least the problems and/or disadvantages described herein and to provide at least the advantages described below.

According to an aspect of the present disclosure, a method is provided which determines diagonals of a second-order partial derivative matrix (a Hessian matrix) of a loss function of network parameters of a neural network and uses the determined diagonals to weight (Hessian-weighting) the network parameters as part of quantizing the network parameters. According to an aspect of the present disclosure, a method is provided which trains a neural network using first and second moment estimates of gradients of the network parameters and uses the second moment estimates to weight the network parameters as part of quantizing the network parameters. According to an aspect of the present disclosure, an apparatus is provided in a neural network, including one or more non-transitory computer-readable media and at least one processor which, when executing instructions stored on one or more non transitory computer readable media, performs the steps of: determining diagonals of a second-order partial derivative matrix (a Hessian matrix) of a loss function of network parameters of a neural network; and using the determined diagonals to weight (Hessian-weighting) the network parameters as part of quantizing the network parameters.

According to an aspect of the present disclosure, a method for network quantization using multi-dimensional vectors is provided, including constructing multi-dimensional vectors representing network parameters from a trained neural network model; quantizing the multi-dimensional vectors to obtain shared quantized vectors as cluster centers; fine-tuning the shared quantized vectors/cluster centers; and encoding using the shared quantized vectors/cluster centers.

According to an aspect of the present disclosure, an apparatus is provided, including one or more non-transitory computer-readable media; and at least one processor which, when executing instructions stored on one or more non-transitory computer readable media, performs the steps of constructing multi-dimensional vectors representing network parameters from a trained neural network model; quantizing the multi-dimensional vectors to obtain shared quantized vectors as cluster centers; fine-tuning the shared quantized vectors/cluster centers; and encoding using the shared quantized vectors/cluster centers.

According to an aspect of the present disclosure, a method of manufacturing a chipset, which includes at least one processor which, when executing instructions stored on one or more non-transitory computer readable media, performs the steps of constructing multi-dimensional vectors representing network parameters from a trained neural network model; quantizing the multi-dimensional vectors to obtain shared quantized vectors as cluster centers; fine-tuning the shared quantized vectors/cluster centers; and encoding using the shared quantized vectors/cluster centers; and the one or more non-transitory computer-readable media which store the instructions.

According to an aspect of the present disclosure, a method of testing an apparatus is provided, including testing whether the apparatus has at least one processor which, when executing instructions stored on one or more non-transitory computer readable media, performs the steps of constructing multi-dimensional vectors representing network parameters from a trained neural network model; quantizing the multi-dimensional vectors to obtain shared quantized vectors as cluster centers; fine-tuning the shared quantized vectors/cluster centers; and encoding using the shared quantized vectors/cluster centers; and testing whether the apparatus has the one or more non-transitory computer-readable media which store the instructions.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 13, through 13D illustrate exemplary plots of accuracy for various lattice quantizations vs. their compression ratios before and after fine-tuning, where the uniform boundaries are set differently in each dimension, according to various embodiments of the present disclosure;

FIGS. 14A through 14D illustrate exemplary plots of accuracy for various universal quantizations vs. their compression ratios before and after fine-tuning, where the uniform boundaries are set differently in each dimension, according to various embodiments of the present disclosure;

DETAILED DESCRIPTION

Figure 1:
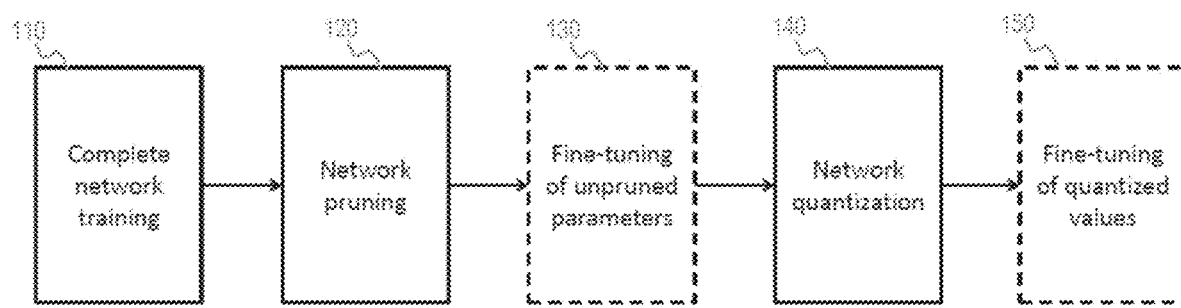
FIG. 1 illustrates an exemplary diagram of neural network compression techniques implemented after the completion of neural network training, according to one embodiment.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

As discussed above, the memory requirements of deep neural nets limit their usage—in particular, their memory/storage requirements exclude devices with limited memory resources. However, there are a variety of means to reduce the overall size of a neural network, which are sometimes jointly referred to as "network compression," See, e.g., Michael C Mazer and Paul Smolensky Skeletonization: A technique for trimming the fat from a network via relevance assessment, in *Advances in Neural Information Processing Systems*, pp. 107-115, 1989 ("Mozer & Smolensky 1989"); Yann LeCun, John S Denker, Sara A Solla, Richard E Howard, and Lawrence D Jackel, Optimal brain damage, in *Advances in Neural Information Processing Systems*, pp. 598-605, 1990 ("LeCun et al. 1990"); Babak Hassibi and David G Stork, "Second order derivatives for network pruning: Optimal brain surgeon" in *Advances in Neural Information Processing Systems*, pp. 164-171, 1993 ("Hassibi & Stork 1993"); Song Han, Jeff Pool, John Tran, and William Dally, Learning both weights and connections for efficient neural network. In *Advances in Neural Information Processing Systems*, pp. 1135-1143, 2015 ("Han et al. 2015a"); Vincent Vanhoucke, Andrew Senior, and Mark Z Mao, Improving the speed of neural networks on CPUs, in *Deep Learning and Unsupervised Feature Learning Workshop, NIPS*, 2011 ("Varthoucke et al. 2011"); Kyuyeon Hwang and Wonyong Sung, Fixed-point feedforward deep neural network design using weights +1, 0, and −1, in *IEEE Workshop on Signal Processing Systems*, pp. 1-6, 2014 ("Hwang & Sung 2014"); Sajid Anwar, Kyuyeon Hwang, and Wonyong Sung, Fixed point optimization of deep convolutional neural networks for object recognition, in *IEEE International Conference on Acoustics, Speech and Signal Processing*, pp. 1131-1135, 2015 ("Anwar et al. 2015"); Matthieu Courbariaux, Jean-Pierre David, and Yoshua Bengio, Training deep neural networks with low precision multiplications, *arXiv preprint arXiv:*1412.7024, 2014 ("Courbariaux et al. 2014"); Mathieu Courbariaux, Yoshua Bergin, and Jean-Pierre David. Binaryconnect: Training deep neural networks with binary weights during propagations. In *Advances in Neural Information Processing Systems*, pp. 3123-3131, 2015 ("Courbariaux et al. 2015"); Suyog Gupta, Ankur Agrawal, Kailash Gopalakrishnan, and Pritish Narayanan, Deep learning with limited numerical precision, in *Proceedings of the 32nd International Conference on Machine Learning*, pp. 1737-1746, 2015 ("Gupta et al. 2015"); Darryl D Sachin S Talathi, and V Sreekanth Annapureddy, Fixed point quantization of deep convolutional networks, *arXiv preprint arXiv:* 1511.06393, 2015 ("Lin, D., et al. 2015"); Zhouhan Lin, Matthieu Courbariaux, Roland Memisevic, and Yoshua Bengio, Neural networks with few multiplications, *arXiv preprint arXiv:* 1510.03009, 2015 ("Lin, Z., et al. 2015"); Mohammad Rastegari, Vicente Ordonez, Joseph Redmon, and Ali Farhadi, XNOR-Net: Imagenet classification using binary convolutional neural networks, *arXiv preprint arXiv:* 1603.05279, 2016 ("Rastegari et al. 2016"); Tara N Sainath, Brian Kingsbury, Vikas Sindhwani, Ebru Arisoy, and Bhuvana Ramabhadran. Low rank matrix factorization for deep neural network training with high-dimensional output targets, in *IEEE International Conference on Acoustics, Speech and Signal Processing*, pp. 6655-6659, 2013 ("Sainath et al. 2013"); Jian Xue, Jinyu Li, and Yifan Gong, Restructuring of deep neural network acoustic models with singular value decomposition, in *INTERSPEECH*, pp. 2365-2369, 2013 ("Xue et al. 2013"); Max Jaderherg, Andrea Vedaldi, and Andrew Zisserman, Speeding up convolutional neural networks with low rank expansions, in *Proceedings of the British Machine Vision Conference,* 2014 ("Jaderberg et al. 2014"); Vadim Lebedev, Yaroslav Ganin, Maksim Rakbuba, Ivan Oseledets, and Victor Lempitsky, Speeding-up convolutional neural networks using fine-tuned CP-decomposition, *arXiv preprint arXiv:*1412.6553, 2014 ("Lebedev et al. 2014"); Zichao Yang, Marcin Moczulski, Misha Denil, Nando de Freitas, Alex Smola, Le Song, and Ziyu Wang, Deep fried convnets, in *Proceedings of the IEEE International Conference on Computer Vision,* pp. 1476-1483, 2015 ("Yang et al. 2015"); Yong-Deok Kim, Eunhyeok Park, Sungjoo Yoo, Taelim Choi, Lu Yang, and Dongjun Shin, Compression of deep convolutional neural networks for fast and low power mobile applications, *arXiv preprint arXiv: 1511.06530*, 2015 ("Kim et al. 2015"); and Cheng Tai, Tong Xiao, Xiaogang Wang, et al., Convolutional neural networks with low-rank regularization, *arXiv preprint arXiv: 1511.06067*, 2015 ("Tai et al. 2015"), all of which are hereby incorporated herein in their entireties.

FIG. 1 illustrates an exemplary diagram of neural network compression techniques implemented after the completion of neural network training, according to one embodiment, FIG. 1 shows some typical network compression schemes, all aimed at reducing the number of network parameters/ weights to be stored. The network compression schemes in FIG. 1 are merely examples and the present disclosure is not limited in any way by what is shown, or not shown, in FIG. 1. Moreover, in embodiments according to the present disclosure, any possible combination of network compression techniques is expressly included.

As shown in FIG. 1, first the neural network training is completed at 110, which means that all of the network parameters/weights have been generated. Network compression includes network pruning 120, fine-tuning of the unpruned network parameters 130, network quantization 140, and fine-tuning of the quantized values 150.

Network pruning 120 removes network parameters completely by setting their values to zero. For a pruned network, only the unpruned network parameters and their respective locations (indices) need to be kept in the original model. For more details, see, e.g., Hassibi & Stork 1993; Han et al. 2015a; and LeCun et al. 1990.

Fine-tuning of the unpruned network parameters 130 may be performed next, in part to recover the loss in precision due to the pruning. For more details, see, e.g., Id.

Figure 3:
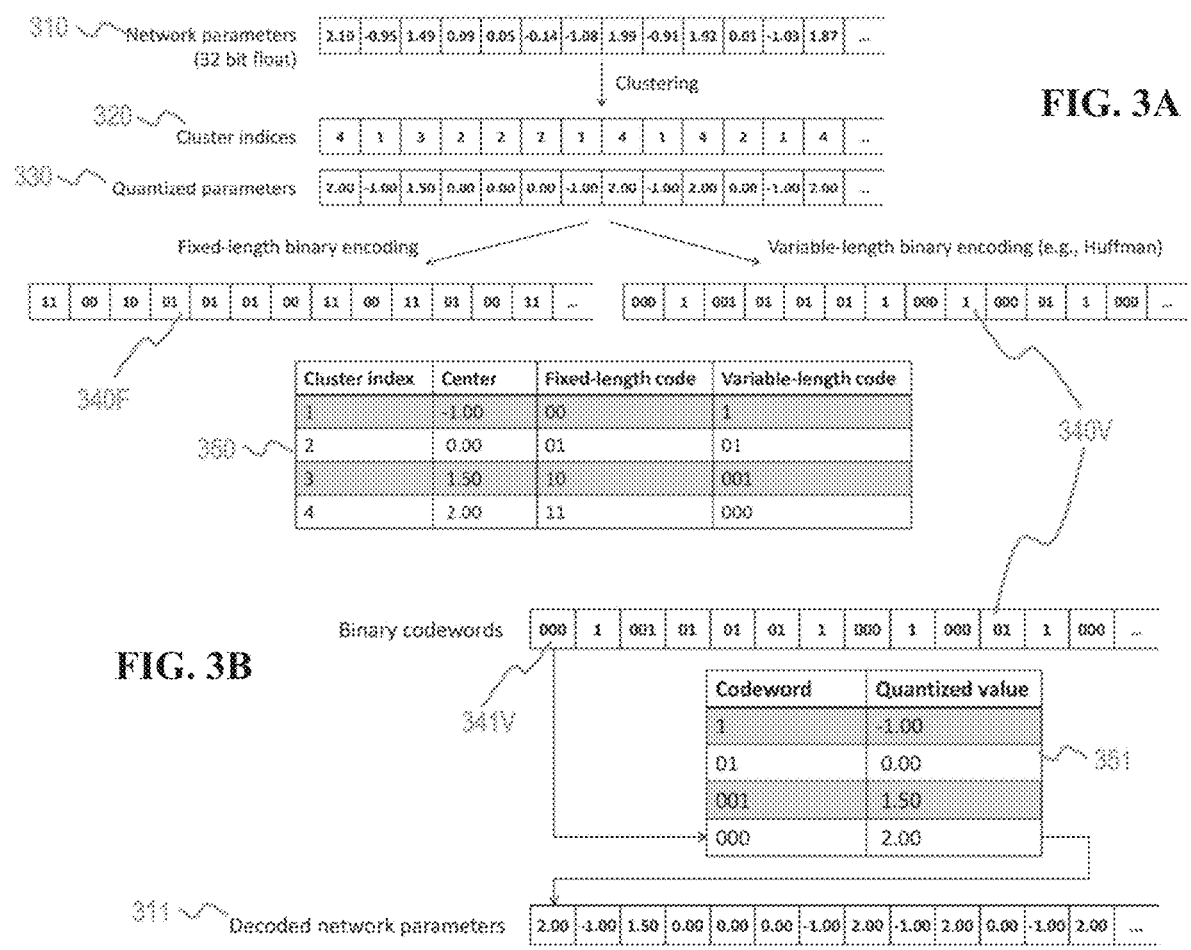
FIG. 3A illustrates an exemplary diagram of clustering and encoding for network quantization, according to one embodiment.
FIG. 3B illustrates an exemplary diagram of decoding binary encoded quantized values during decompression, according to one embodiment.

Next, network quantization 140 is performed. The basic idea of network quantization is to group network parameters into a small number of clusters, quantize each network parameter to the value of the cluster center that the network parameter belongs to, and store binary encoded quantized values instead of actual parameter values. Accordingly, network quantization reduces the number of bits needed for representing (unpruned) network parameters by quantizing them and encoding their quantized values into binary codewords with smaller bit sizes. The quantized values can be retrieved from the binary codewords stored instead of actual values by using a lookup table of a small size. See, e.g., FIGS. 3A and 3B and their description below for an example.

Network parameters in the same cluster will have the same quantized value (i.e., cluster center) in the prediction stage. In other words, representative values (i.e., quantized values) of the clusters (cluster centers) are encoded and stored in memory, and they are read based on the binary codewords stored instead of the actual quantized values and used for prediction.

Finally, the quantized values (i.e., the cluster centers) are fine-tuned at 150. As noted above, there are different techniques of network compression and, in that regard, fine-tuning stages 130 and 150 are optional, but they become more and more necessary to recover original performance as the pruning and/or quantization becomes more and more aggressive.

One specific approach to network quantization, i.e., k-means clustering followed by encoding, is discussed below in reference to FIGS. 2 and 3A-3B.

Figure 2:
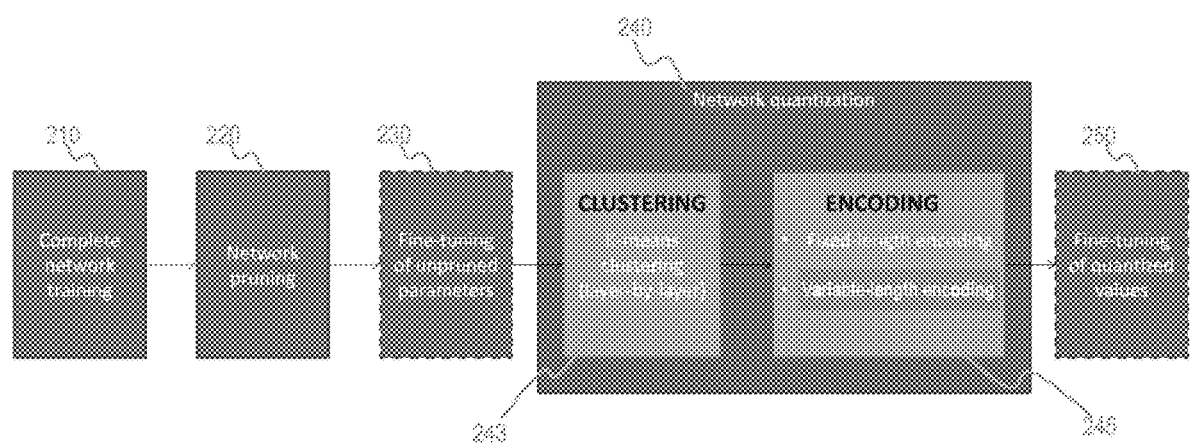
FIG. 2 illustrates another exemplary diagram of neural network compression techniques implemented after the completion of neural network training, according to one embodiment.

FIG. 2 illustrates another exemplary diagram of neural network compression techniques implemented after the completion of neural network training, according to one embodiment. After neural network training is completed at 210, network compression including network pruning 220, fine-tuning of the unpruned network parameters 230, network quantization 240, and fine-tuning of the quantized values 250 is performed.

In FIG. 2, specific details of a network quantization approach 240 are further described. The network quantization 240 includes clustering 243 and encoding 245. Clustering 243 includes k-means layer-by-layer clustering, in which the network parameters are partitioned into k disjoint sets (clusters), and then the network parameters in each cluster are quantized to the same value or "representative value," i.e., in this case, their cluster center value. After clustering, lossless binary encoding 245 encodes the quantized parameters into binary codewords to store instead of actual parameter values. Either fixed-length binary encoding or variable length binary encoding (such as, e.g., Huffman or Lempel-Ziv-Welch (LZW) coding) can be employed for encoding 245. For more details, see, e.g., Han, Song, et al. "Deep compression: Compressing deep neural networks with pruning, trained quantization and Huffman coding," *arXiv preprint arXiv;* 1510.00149 (2015) ("Han et al. 2015b"); and Gong, Yunchao et al. "Compressing deep convolutional networks using vector quantization." *arXiv preprint arXiv:* 1412.6115 (2014) ("Gong et al. 2014"), all of which are hereby incorporated herein by reference in their entirety.

FIG. 3A illustrates an exemplary diagram of clustering and encoding for network quantization, according to one embodiment.

In FIG. 3A, the original network parameters are 32-bit float numbers 310. These network parameters 310A are grouped into clusters with cluster indices 320. For example, there are four clusters 1, 2, 3, and 4 in FIG. 3A, each of which has a representative value ("quantized parameter") 330, i.e., −1.00, 0.00, 1.50, and 2.00, respectively. As can be seen, the quantization in this instance results in a loss of accuracy in comparison with the original 32-bit float numbers 310.

Either fixed-length encoding or variable-length encoding, e.g., Huffman or LZW, may be employed to map the cluster indices 1, 2, 3, and 4 into fixed-length binary codewords 00, 01, 10, 11 (340F) or variable-length binary codewords 1, 01, 001, 000 (340V) (e.g., Huffman encoded codewords), as shown in a table 350.

FIG. 3B illustrates an exemplary diagram of decoding binary quantized values during decompression, according to one embodiment. FIG. 3B illustrates decoding using the example from FIG. 3A. The variable-length binary codewords 340V resulting from the compression in FIG. 3A, are decompressed to retrieve the quantized values. In this example, binary codewords stored in memory are used to read quantized values from a mapping table. Specifically, in FIG. 3B, using the first compressed cluster index codeword 341V ("000"), a mapping table 351 shows that the matching quantized parameter value is "2.00", and thus the first decoded network parameter is "2.00" in decoded network parameters 311. The decoded values are then used in the neural network for prediction.

However, k-means clustering, such as shown in FIGS. 2 and 3A, and discussed in Han et al. 2015b and Gong et al. 2014, has its flaws, as discussed further below.

First, a mathematical model is used to describe neural networks generally and then k-means clustering specifically, below.

Equation (1) represents a general non-linear neural network whose structure performs function $f$ that maps input x into output vector y:

$$y = f(x;w) \tag{1}$$

where $w=[w_1\ w_2\ \ldots\ w_N]$ is the vector consisting of each of the trainable network parameters $w_i$ (i=1, 2, ..., N), where N is the total number of such parameters.

As mentioned above, an objective function is used to minimize error during neural network training to properly adjust the weight vectors (network parameters). The function loss(y,ŷ) in Equation (2) is defined as the objective function which needs to be minimized in average by training:

$$\text{loss}(y,\hat{y}) = \text{loss}(f(x;w),\hat{y}(x)) \quad (2)$$

where $y=f(x;w)$ is the predicted output of the neural network for input x and $\hat{y}=\hat{y}(x)$ is the expected output for input x. As would be understood by one of ordinary skill in the art, there are many types of loss functions which may be used, including, for example, cross entropy and mean square error loss functions.

An average loss function L for any input data set X is defined in Equation (3)(a) as follows:

$$L(X;w) = \frac{1}{|X|}\sum_{x \in X}\text{loss}(f(x;w),\hat{y}(x)) \quad (3)(a)$$

As the input data set X becomes larger and larger, the average loss function L becomes closer and closer to the expected loss function $E_x$ as shown in Equation (3)(b):

$$L(X;w) \approx E_x[\text{loss}(f(x;w),\hat{y}(x))] \quad (3)(b)$$

Given a training set $X_{train}$, the network parameters w are optimized (ŵ) by solving Equation (4) using, for example, a SGD optimization method with mini-batches:

$$\hat{w} = \underset{w}{\text{argmin}} L(X_{train};w) = \underset{w}{\text{argmin}} \sum_{x \in X_{train}} \text{loss}(f(x;w),\hat{y}(x)) \quad (4)$$

As discussed above, the SGD process is a process where, in each iteration, the input vector, output, and errors are computed for a few examples, the average gradient computed, and the parameters adjusted, until the average of the objective function stops decreasing.

After training/optimization (or after pruning and/or fine-tuning), network quantization is performed, in this case, by k-means layer-by-layer clustering, where the network parameters $w=\{w_i\}_{i=1}^N$ are clustered into k disjoint sets/clusters $C_1, C_2, \ldots, C_k$. K-means clustering generates the clusters that minimize the quantization error defined in Equation (5)(a):

$$\underset{C_1,C_2,\ldots,C_k}{\text{argmin}} \sum_{i=1}^{k}\sum_{w \in C_i}\|w - c_i\|^2 \quad (5)(a)$$

where $c_i$ is the mean of network parameters/points in cluster $C_i$ as defined by Equation (5)(b):

$$c_i = \frac{1}{|C_i|}\sum_{w \in C_i} w \quad (5)(b)$$

K-means clustering is a non-deterministic polynomial time hard (NP-hard) problem; however, as would be known to one of ordinary skill in the art, there are a number of efficient heuristic algorithms that are commonly employed which converge quickly to a local optimum. One of the most well-known algorithms is Lloyd's algorithm. See Stuart Lloyd. Least squares quantization in PCM. *IEEE transactions an information theory*, 28(2): 129-137, 1982, which is incorporated herein by reference in its entirety.

Figure 4:
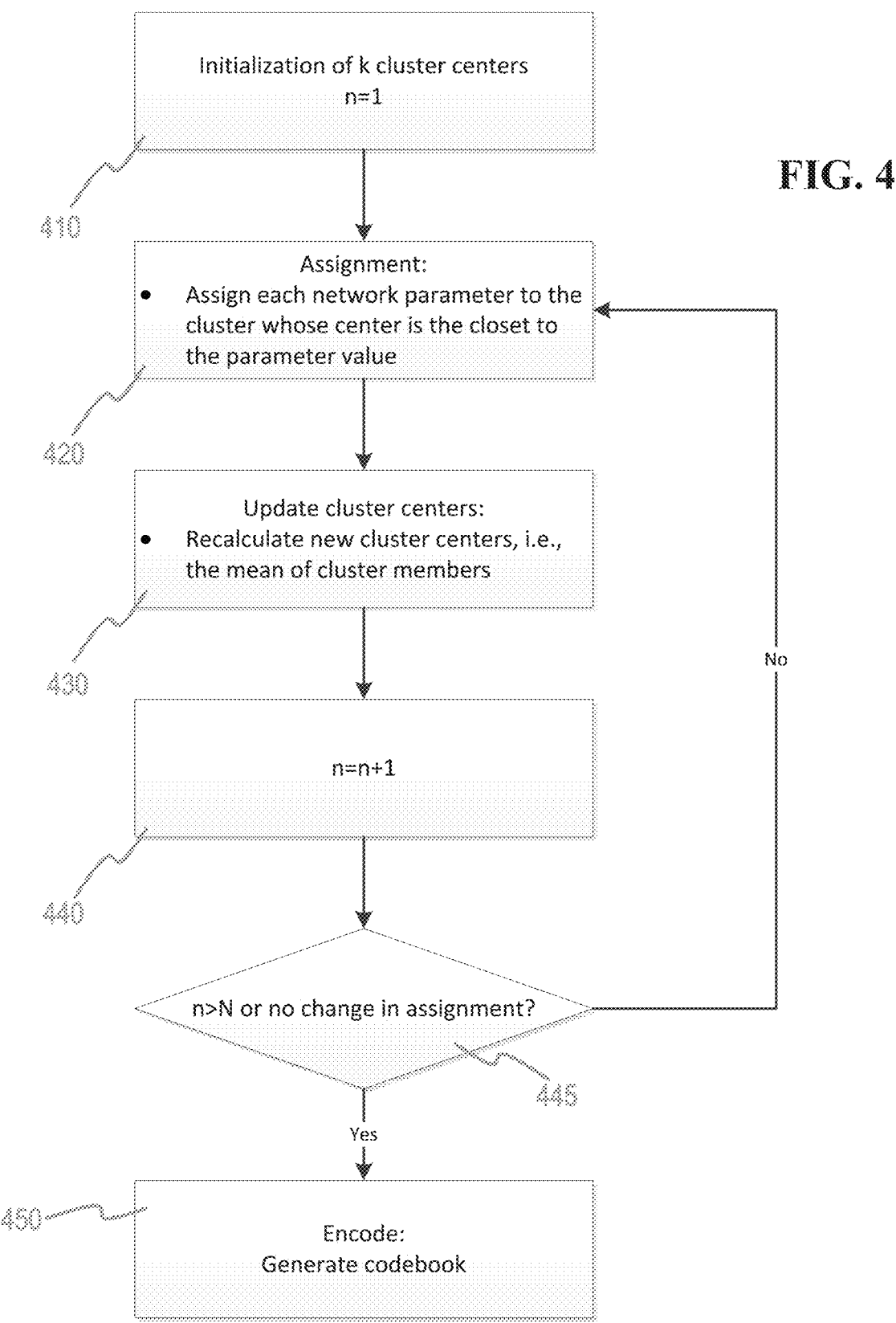
FIG. 4 illustrates an exemplary flowchart for performing k-means clustering using Lloyd's algorithm, according to one embodiment.

FIG. 4 illustrates an exemplary flowchart for performing k-means clustering using Lloyd's algorithm, according to one embodiment. Broadly speaking, Lloyd's algorithm proceeds by repeating the two steps of assignment and updates until Lloyd's algorithm converges or reaches the maximum number of iterations.

In FIG. 4, a set of k cluster centers $c_1^{(0)}, c_2^{(0)}, \ldots, c_k^{(0)}$, are initialized and iterative index n is set to 1 at 410. At 420, each network parameter is assigned to the cluster whose center is closest to the parameter value. This means partitioning the points according to a Voronoi diagram generated using the cluster centers. At 430, after all of the network parameters have been (re)assigned in 420, a new set of k cluster centers $c_1^{(x)}, c_2^{(x)}, \ldots, c_k^{(x)}$ (x=iteration number) are calculated. At 440, the number of iterations is updated ("n=n+1") and, at 445, it is determined whether the iterative process has ended. More specifically, it is determined whether the number of iterations has exceeded a limit ("n>N") or there was no change in assignment at 420 (which means the algorithm has effectively converged). If it is determined that the process has ended at 445, a codebook for quantized network parameters is generated (similar to, e.g., table 350A in FIG. 3) at 450. If it is determined that the process has not ended at 445, the process repeats to assignment at 420.

Next, the compression ratio achieved by using k-means clustering for network quantization is calculated. In order to perform these calculations, it is assumed that, before quantization, each network parameter $w_i$ (i=1, 2, ..., N), where N is the total number of such parameters, has a length of b bits. Thus, Nb bits are required to store the network parameters before quantization.

Assuming k-means clustering is used with variable-length encoding, let $C_i$ be the number of network parameters in cluster i, where 1≤i≤k, and $b_i$ is the number of bits of the codeword assigned for the network parameters in cluster i (i.e., the codeword for cluster i). Thus, the binary codewords are only $\Sigma_{i=1}^{k}|C_i|b_i$ bits rather than Nb bits. For a lookup table that stores the k binary codewords ($b_i$ bits for 1≤i≤k) with their matching quantized network parameter values (b bits each), an additional $\Sigma_{i=1}^{k}b_i+kb$ is needed. Thus, in Equation (6)(a):

$$\text{Variable length Encoding Compression Ratio} = \frac{Nb}{\sum_{i=1}^{k}(|C_i|+1)b_i + kb} \quad (6)(a)$$

As seen above, in k-means clustering with variable-length encoding, the compression ratio depends not only on the number of clusters, i.e., k, but also on the sizes of the various clusters, i.e., $|C_i|$, and the assigned number of bits for each cluster codeword, i.e., $b_i$, for 1≤i≤k. However, for fixed-length codes, where all codewords are of the same length i.e., $b_i=\lceil \log_2 k \rceil$, for all i, the ratio reduces to Equation (6)(b):

$$\text{Fixed length Encoding Compression Ratio} = \frac{Nb}{N\lceil \log_2 k \rceil + kb} \quad (6)(b)$$

As seen above, in k-means clustering with fixed-length encoding, the compression ratio depends only on the number of clusters, i.e., k, assuming N and b are given. Here, it is not necessary to store k binary codewords in a lookup table for fixed-length codes since they can be implicitly known, e.g., if the quantized values are encoded into binary numbers in increasing value from 0 to k−1 and stored in the same order.

One of the problems with using conventional k-means clustering methods for network quantization such as discussed above is that all network parameters are treated as if they have equal importance. However, some network parameters may have more of an impact on the final loss function and thereby the performance of a neural network, while other network parameters may have a negligible impact on the quantization and the resulting performance. Treating all network parameters as having equal weight, such as is done in conventional k-means clustering methods for network quantization, is not optimal when minimizing the impact on the loss function and/or the final resulting performance.

Another problem with conventional k-means clustering is that the impact of the encoding scheme on the compression ratio is not considered. Assuming that fixed-length encoding is employed to encode quantized values, the compression ratio is simply determined by the number of clusters k. See, e.g., Equation (6)(b) above. However, when a variable-length lossless encoding scheme is used, the compression ratio is determined not only by the number of clusters k, but also by the sizes of the clusters and the assigned sizes of the codewords—which are determined by the coding that is applied. See, e.g., Equation (6)(a) above. Thus, when variable-length encoding is used, such as, e.g., Huffman or LZW encoding, where the average codeword length asymptotically approaches the entropy limit, conventional k-means clustering does not take any of these factors into account, thereby leading to even greater performance loss.

In order to, inter alia, address these issues with conventional k-means clustering, the present disclosure describes (1) utilizing the second-order partial derivatives, i.e., the diagonal of the Hessian matrix, of the loss function with respect to the network parameters as a measure of the significance of different network parameters; and (2) solving the network quantization problem under a constraint of the actual compression ratio resulting from the specific binary encoding scheme that was employed. Accordingly, the description below is broken into three sections: I. Network Quantization using Hessian-Weight; II. Entropy-Constrained Network Quantization; and III. Experimental/Simulation Results.

The present disclosure describes network compression techniques, including network quantization schemes, which provide greater performance results than, inter alia, conventional k-means clustering, such as, for example:

Hessian-weighted k-means clustering
Uniform quantization (with Hessian-weighted cluster centers)
Iterative algorithm for entropy-constrained scalar quantization (ECSQ)
Quantization of all layers together Embodiments of the present disclosure can be used to quantize the network parameters of a neural network in order to reduce the storage (memory) size for the network while also minimizing performance degradation. The techniques described in this disclosure are generally applicable to any type of neural network.

Figure 5:
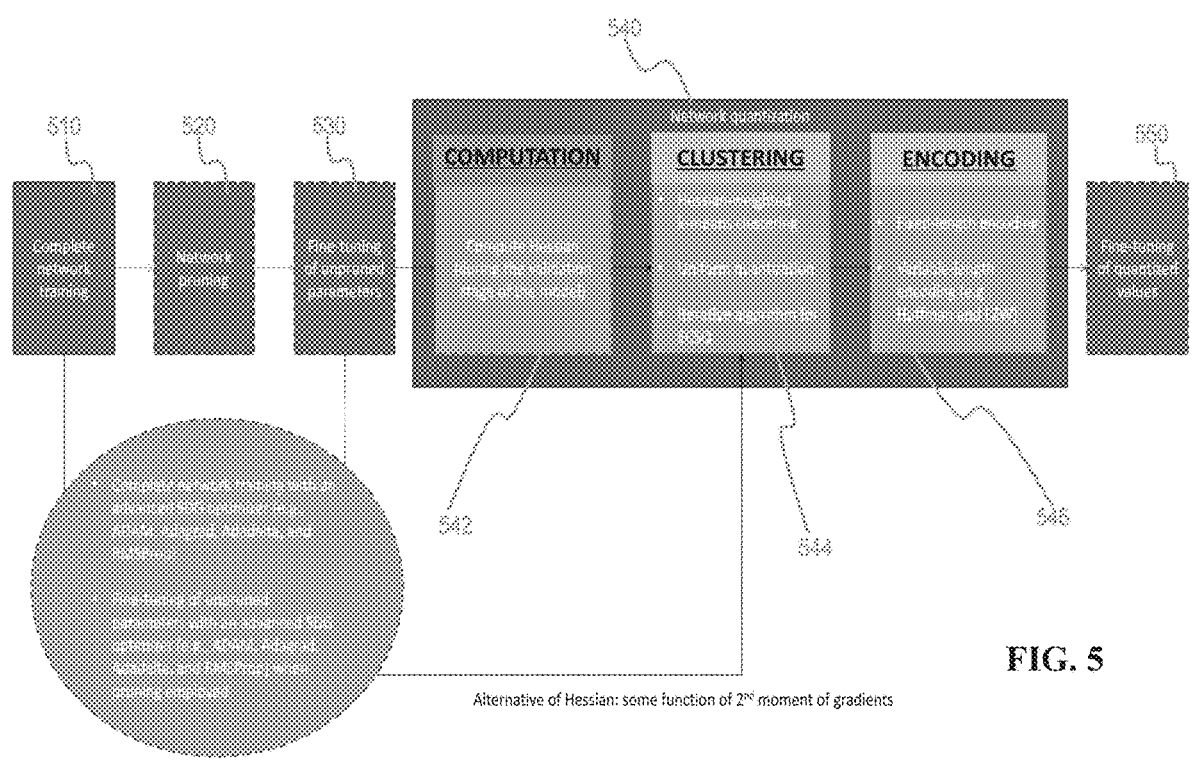
FIG. 5 illustrates an exemplary diagram of the present network quantization system, according to one embodiment.

FIG. 5 shows a network compression scheme with network quantization techniques according to embodiments of the present disclosure. In FIG. 5, network pruning 520, fine-tuning of the unpruned network parameters 530, and the fine-tuning of the quantized values 550 may be similar to network pruning 220, fine-tuning of the unpruned network parameters 230, and the fine-tuning of the quantized values 250 shown in FIG. 2.

Network quantization 540 of FIG. 5 has three blocks: computation 542, clustering 544, and encoding 546. As discussed elsewhere in the present disclosure, computation 542 involves computing the Hessian matrix, which can be done during the validation stage, which follows network training 510. Clustering 540, as described in detail elsewhere in the present disclosure, may involve one or more of Hessian-weighted k-means clustering, uniform quantization, and iterative algorithms for entropy-constrained scalar quantization (ECSQ). Encoding 546, as described in detail elsewhere in the present disclosure, may involve one or more of fixed-length and variable-length encoding. SDG Optimizers identified and described elsewhere in the present disclosure are mentioned on the bottom of FIG. 5 in terms of their effects on training 510 and fine-tuning 530.

I. Network Quantization Using Hessian-Weight

In this section, the impact of quantization errors on the loss function of a neural network is analyzed and a Hessian-weight that can be used to quantify the significance of different network parameters in quantization is derived.

The Hessian matrix or "Hessian" consists of second-order partial derivatives. In LeCun et al. 1990 and Hassibi & Stork 1993, a Hessian matrix is used in pruning network parameters.

Below, it is shown that the Hessian, in particular, the diagonal of the Hessian, can be employed in network quantization as well as in order to give different weights to the quantization errors of different network parameters A Hessian-weighted k-means clustering method is described for network quantization, where the second-order derivatives (a.k.a., Hessian) of the network loss function with respect to network parameters are used as weights in weighted k-means clustering for network parameter clustering.

A. Hessian-Weighted Quantization Error

The average loss function L(X;w) for any input data set X can be expanded by the Taylor series with respect to w as shown in Equation (7)(a):

$$\delta L(X;w) = g(w)^T \delta w + \tfrac{1}{2} \delta w^T H(w) \delta w + O(\|\delta w\|^3) \qquad (7)(a)$$

where $w = [w_1 \; w_2 \; \ldots \; w_N]^T$ and, as shown in Equations (7)(b):

$$g(w) = \frac{\partial L(X;w)}{\partial w}, \; H(w) = \frac{\partial^2 L(X;w)}{\partial^2 w} \qquad (7)(b)$$

where g(w) is the matrix of gradients and H(w) is the Hessian square matrix consisting of the second order partial derivatives. Assuming that training/fine-tuning has completed, the network parameters are optimized and the loss function has reached a local minima (w=ŵ). At local minima, the gradients are all zero, i.e., g(ŵ)=0, and thus the first term on the right-hand side of Equation (7)(a) can be ignored. Similarly, the third term on the fight-hand side of Equation (7)(a) can also be ignored under the assumption that the average loss function is approximately quadratic at the local minimum w=ŵ. Finally, for simplicity, the Hessian matrix H(w) is approximated as a diagonal matrix by setting its off-diagonal terms to zero. The Equation (7)(c) follows from Equation (7)(b):

$$\delta L(X; \hat{w}) \approx \frac{1}{2} \sum_{i=1}^{N} h_{ii}(\hat{w}) |\delta \hat{w}_i|^2 \qquad (7)(c)$$

where $h_{ii}(\hat{w})$ is the second-order partial derivative of the average loss function with respect to $w_i$ evaluated at $w=\hat{w}$, which is the i-th diagonal element of Hessian matrix $H(\hat{w})$. Next, Equation (7)(c) is connected to the problem of network quantization by treating $\delta \hat{w}_i$ as the quantization error of network parameter $w_i$ at its local optimum $w_i=\hat{w}_i$, i.e., $\delta \hat{w}_i = \overline{w}_i - \hat{w}_i$, where $\overline{w}_i$ is a quantized value of $\hat{w}_i$. Thus, the local impact of quantization on the average loss function at $w=\hat{w}$ can be quantified approximately as Equation (7)(d):

$$\delta L(X; \hat{w}) \approx \frac{1}{2} \sum_{i=1}^{N} h_{ii}(\hat{w}) |\hat{w}_i - \overline{w}_i|^2 \qquad (7)(d)$$

At a local minimum, the diagonal elements of the Hessian matrix $H(\hat{w})$, i.e., the $h_{ii}(\hat{w})$'s, are all non-negative and thus the summation in Equation (7)(d) is always additive, implying that the average loss function either increases or stays the same.

The interactions between retraining and quantization are not considered above. In this disclosure, the expected loss due to quantization of all network parameters is analyzed assuming no further retraining and the focus is on finding optimal network quantization schemes that minimize the performance loss while maximizing the compression ratio. After quantization, however, quantized values (cluster centers) were fine-tuned in experiments discussed further below so that the loss due to quantization could be somewhat recovered and the performance further improved.

B. Hessian-Weighted k-Means Clustering

In the previous section, the local impact of Hessian-weighted quantization on the average loss function at $w=\hat{w}$ was approximately quantified in Equation (7)(d). In this section, the relationship indicated by Equation (7)(d) is used to design network quantization schemes that reduce memory requirements and minimize quantization loss. For notational simplicity, $w_i \equiv \hat{w}_i$ and $h_{ii} \equiv h_{ii}(\hat{w}_i)$ is assumed from now on. From Equation (7)(d), the optimal clustering that minimizes the Hessian-weighted distortion measure is given by Equation (8)(a):

$$\underset{c_1, c_2, \ldots, c_k}{\operatorname{argmin}} \sum_{j=1}^{k} \sum_{w_i \in C_j} h_{ii} \|w_i - c_j\|^2, \qquad (8)(a)$$

where $h_{ii}$ is the second-order partial derivative of the loss function with respect to network parameter $w_i$ as shown in Equation (8)(b):

$$h_{ii} = \frac{\partial^2 L}{\partial w_i^2}. \qquad (8)(b)$$

and $c_j$ is the Hessian-weighted mean of network parameters in cluster $C_j$ as shown in Equation (8)(c):

$$c_j = \frac{\sum_{w_i \in C_j} h_{ii} w_i}{\sum_{w_i \in C_j} h_{ii}}. \qquad (8)(c)$$

By contrast with the conventional k-means clustering technique and its distortion measure in Equation (5)(a), the cluster center in distortion measure Equation (8)(a) is now the Hessian-weighted cluster center, i.e., the Hessian-weighted mean of cluster members in Equation (8)(c).

In addition, Equation (8)(a) gives a larger penalty in computing quantization error when the second-order derivative is larger in order to avoid a large deviation from its original value, since the impact on the loss function due to the quantization is expected to be larger for that network parameter. Hessian-weighted k-means clustering is locally optimal in minimizing the quantization loss when a fixed-length binary code is employed for encoding quantized values, where the compression ratio solely depends on the number of clusters as shown in Equation (6)(b).

Figure 6:
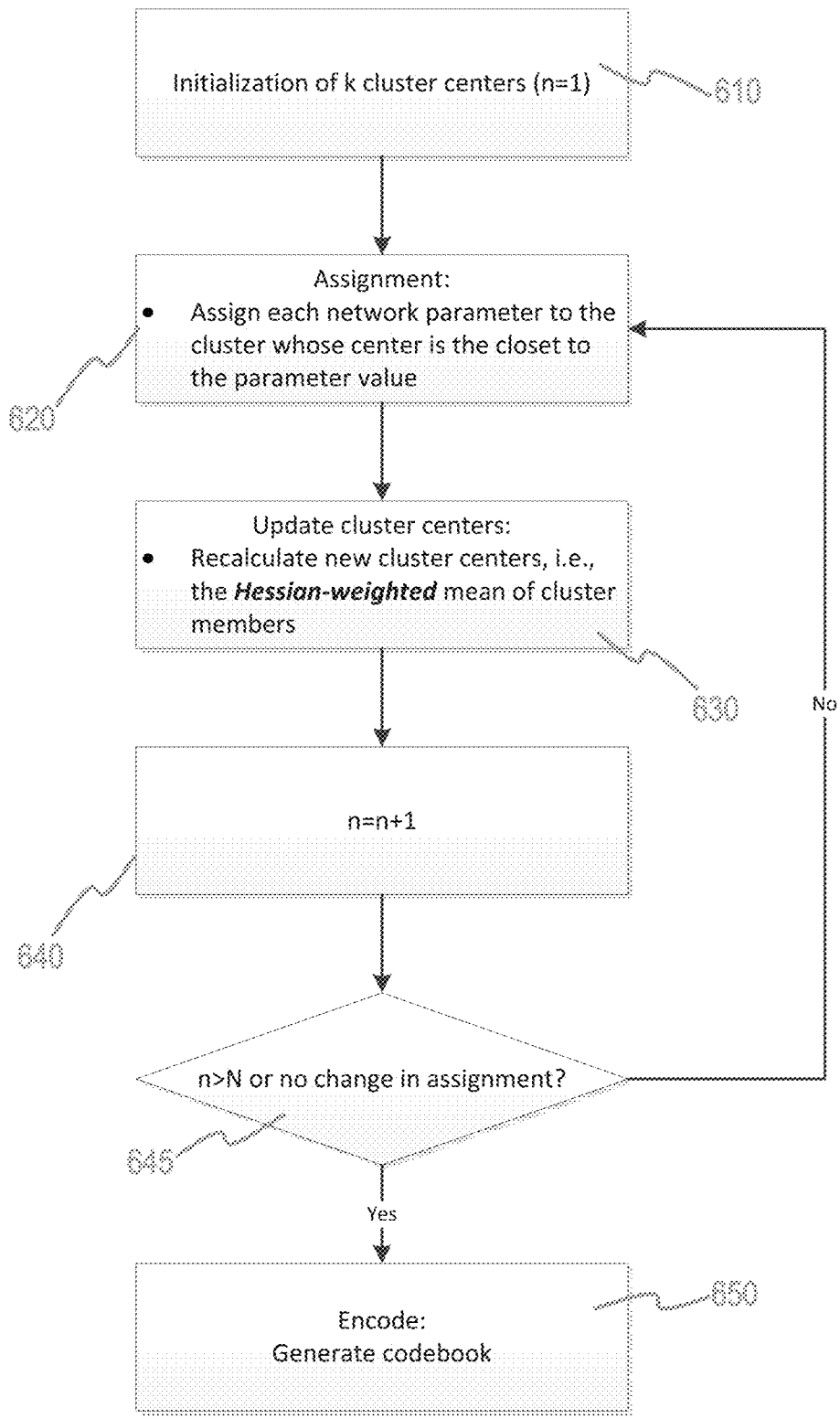
FIG. 6 illustrates an exemplary flowchart for performing Hessian-weighted k-means clustering using Lloyd's algorithm, according to one embodiment.

FIG. 6 illustrates an exemplary flowchart for performing Hessian-weighted k-means clustering using Lloyd's algorithm, according to one embodiment.

In FIG. 6, a set of k cluster centers $c_1^{(0)}, c_2^{(0)}, \ldots, c_k^{(0)}$, are initialized and iterative index n is set to 1 at 610. At 620, each network parameter is assigned to the cluster whose center is closest to the parameter value. This may be done by partitioning the points according to the Voronoi diagram generated by the cluster centers. At 630, after all of the network parameters have been (re-)assigned in 620, a new set of Hessian-weighted cluster center means are calculated. At 640, the number of iterations is updated ("n=n+1") and, at 645, it is determined whether the iterative process has ended. More specifically, it is determined whether the number of iterations has exceeded a limit ("n>N") or there was no change in assignment at 620 (which means the algorithm has effectively converged). If it is determined that the process has ended in 645, a codebook for quantized network parameters is generated at 650. If it is determined that the process has not ended in 645, the process repeats to assignment at 620.

C. Hessian Computation

In order to perform Hessian-weighted k-means clustering, the second-order partial derivatives of the average loss function with respect to each of the network parameters needs to be evaluated, i.e., Equation (9) needs to be computed:

$$h_{ii}(\hat{w}) = \frac{\partial^2 L(X; w)}{\partial w_i^2}\bigg|_{w=\hat{w}} = \frac{1}{|X|} \frac{\partial^2}{\partial w_i^2} \sum_{x \in X} \operatorname{loss}(f(x; w), \hat{y}(x))\bigg|_{w=\hat{w}} \qquad (9)$$

Only the diagonal elements of the Hessian matrix, i.e., the $h_{ii}(\hat{w})$'s, are of interest. As would be known to one of ordinary skill in the art, there are various ways of computing the diagonal elements of a Hessian matrix. An efficient way of computing the diagonal of Hessian was derived in LeCun et al. 1990 and Yarm LeCun, *Mod'eles connexionnistes de l'apprentissage*, PhD thesis, Paris 6, 1987 ("LeCun 1987"). This computational technique is based on the back propagation method that is similar to the back propagation algorithm used for computing the first-order partial derivatives (the gradients). Thus, computing the diagonal elements of the Hessian matrix is of the same order of complexity as computing the gradients.

Accordingly, although Hessian computation and network quantization are performed after completing network training in one embodiment described herein, in other embodiments of the present disclosure, the Hessian computation (or other equally effective computations, as discussed in Sect. I.E below) could be performed even during the training stage when the gradients are being calculated.

The loss function used to compute the Hessian diagonals in one embodiment is the average loss function over some input set X. To this end, the same data set used for training (i.e., training data set) could be re-used or another data set, e.g., validation data set, could be used. In experiments, it was observed that even using a small subset of the training/validation data set was sufficient to yield good approximations of the Hessian diagonals, which led to good quantization results.

D. Quantization of all Layers

According to an embodiment of the present disclosure, quantization is performed on the network parameters of all of the layers of the neural network together at once by taking the Hessian-weight into account, rather than performing layer-by-layer quantization, as done in Gong et al. (2014) and Han et al. (2015a). The impetus for performing quantization for all layers at once is the fact that the impact of quantization errors on performance varies significantly across layers—some layers, e.g., convolutional layers, may be more important than others. Accordingly, performing quantization on all layers together with the network quantization schemes using Hessian-weight disclosed herein may result in improved performance.

Another impetus for quantization across all layers is the increasing depth of deep neural networks (i.e., the increasing number of varied layers). See, e.g., He, Kaiming, et al. "Deep residual learning for image recognition," arXiv preprint arXiv:1512.03385 (2015). (He et al. 2015) (in which ResNet is described), which is incorporated by reference herein in its entirety. In such deep neural networks, quantizing network parameters of all layers together is more efficient since the time for optimizing clustering layer-by-layer increases exponentially with respect to the number and/or complexity of layers.

E. Alternatives to Hessian-Weights

According to an embodiment of the present disclosure, a function of the second moment estimates of gradients is used as an alternative to using Hessian weights. One advantage of using the second moment estimates of gradients is that they can be computed during training and thus can be stored for later use with no additional computation. Using a function of the second moment estimates of gradients may be particularly advantageous when the neural network is trained by advanced SGD optimizers such as ADAM, Adagrad, Adadelta, or RMSprop. See, e.g., Kingma, Diederik, and Jimmy Ba. "ADAM: A method for stochastic optimization." arXiv preprint arXiv:1412.6980 (2014). ("Kingma et al 2014"); Duchi, John, Elad Hazan, and Yoram Singer. "Adaptive subgradient methods for online learning and stochastic optimization," *Journal of Machine Learning Research* 12. Jul. (2011): 2121-2159, ("Duchi et al. 2011"); Zeiler, Matthew D. "ADADELTA: an adaptive learning rate method." arXiv preprint arXiv:1212.5701 (2012). ("Zeiter 2012"); and Tieleman, Tijmen, and Geoffrey Hinton. "Lecture 6.5-rmsprop: Divide the gradient by a running average of its recent magnitude." COURSERA: Neural Networks for Machine Learning 4.2 (2012), ("LECTURE 6.5"), all of which are incorporated herein by reference in their entireties.

As an example, the square root of the second moment estimates of gradients could be used as an alternative to Hessian weights when an ADAM SGD optimizer (Kingma et al. (2014)) is employed, as shown in Equation (10)(a):

$$h_{ii} = \frac{\partial^2 L}{\partial w_i^2} \approx f(\sqrt{\hat{v}_i}),\tag{10)(a)}$$

for some function $f$ of the square root of $\hat{v}_i$, the second moment estimate of gradient i.

The ADAM method computes individual adaptive learning rates for different network parameters from estimates of the first and second moments of the gradients; the name ADAM is itself derived from adaptive moment estimation. The parameter update in the ADAM algorithm uses Equation (10)(b):

$$w_i(t) = w_i(t-1) - \alpha \frac{\hat{m}_i(t)}{\sqrt{\hat{v}_i(t)+\epsilon}}\tag{10)(b)}$$

where $w_i(t)$ is the parameter updated at iteration t, $\hat{m}_i(t)$ is the calculated estimate of the momentum (first moment) at iteration t, and $\hat{v}_i(t)$ is the calculated estimate of the second moment at iteration t. The first moment $\hat{m}_i(t)$ and second moment $\hat{v}_i(t)$ are calculated as a function of the gradient $g_i(t)$ at iteration t by Equations (10)(c):

$$\hat{m}_i(t)=m_i(t)/(1-\beta_1^t)$$

$$\hat{v}_i(t)=v_i(t)/(1-\beta_2^t)\tag{10)(c)}$$

where $m_i(t)$ and $v_i(t)$ are calculated as shown in Equations (10)(d):

$$m_i(t)=\beta_1 m_i(t-1)+(1-\beta_1)g_i(t)$$

$$v_i(t)=\beta_2 v_i(t-1)+(1-\beta_2)g_i^2(t)\tag{10)(d)}$$

This ADAM method can be compared with Newton's optimization method using Hessian weights. Newton's optimization method is applied as shown in Equation (11):

$$w(t)=w(t-1)-H^{-1}(t)g(t)\tag{11}$$

where w(t) is the vector of network parameters updated at iteration t, $H^{-1}(t)$ is the inverse of the Hessian matrix computed at iteration t, and g(t) is the gradient at iteration t.

From Equations (10)(b) and (11), it can be seen that the denominator $\sqrt{\hat{v}_i(t)+\epsilon}$ in Equation (10)(b) acts like the Hessian H(t) in Equation (11) while the numerator $\hat{m}_i(t)$ in Equation (10)(b) corresponds to gradient g(t) in Equation (11). It is this correspondence that indicates some function, like square root, of the second moment estimates of gradients can be used as an alternative to the Hessian weights. Further discussion on the relation between the second moments of gradients and second-order derivatives can be found in Appendix A.1 of Choi et al., "Towards the Limit of Network Quantization", *arXiv preprint arXiv:* 1612.01543v1, Dec. 5, 2016 ("Choi et al. 2016"), which is incorporated herein by reference in its entirety.

For other embodiments, similar functions of the second moment estimates can be found and used for ADAM and any of the other SGD optimizers. As mentioned above, one advantage of using the second moment estimates is that they are computed during training and can be stored for later use with no additional computational cost.

II. Entropy-Constrained Network Quantization

In Section I, methods for quantifying and minimizing the performance loss due to network quantization were considered. In this section, methods to maximize the compression ratio are considered, especially in terms of taking the compression ratio properly into account when optimizing network quantization.

A. Entropy Coding

After clustering and optionally pruning network parameters, a variable-length binary code can be used for lossless data compression by assigning binary codewords of different lengths to different symbols (i.e., quantized values). For example, Huffman coding assigns short codewords to frequent symbols and long codewords to less frequent symbols.

Theoretically, there is a set of optimal codes that can achieve the minimum average codeword length for a given source. Entropy is the theoretical limit of the average codeword length per symbol that can be achieved by lossless data compression, as proved by Shannon. See Claude E. Shannon; *A Mathematical Theory of Communication*, Bell System Technical Journal, Vol. 27, pp. 379-423, 623-656, 1948. Because of this, coding which achieves optimal/near-optimal compression is sometimes called entropy coding. It is known that optimal codes can achieve this limit with some overhead less than 1 bit when only integer-length codewords are allowed. See, e.g., Thomas M Cover and Joy A Thomas. *Elements of information theory*. John Wiley & Sons, 2012, which is incorporated herein by reference in its entirety.

B. Entropy-Constrained Scalar Quantization (ECSQ)

When variable-length entropy encoding is employed, the compression ratio is a function of the average codeword length achieved by the specific encoding scheme employed. In such cases, the network quantization procedure can be optimized by minimizing the quantization loss under a constraint on the average codeword length. When such an entropy encoding scheme is employed, the optimization problem for network quantization can be reduced to an entropy constrained scalar quantization (ECSQ) problem, as explained below.

For fixed-length encoding of quantized values, k-means clustering is the best scheme at least for minimizing the quantization error since the compression rate depends on the number of clusters only. However, for variable-length encoding, e.g., Huffman or LZW encoding, the compression rate depends not only on the number of clusters but also on the sizes of the clusters and the lengths of the codewords.

Thus, in such cases, it is better to minimize the quantization loss under the constraint of the actual compression ratio, which is a function of the average codeword length resulting from the specific encoding scheme employed at the end. One approach is to solve the problem with Hessian-weight in Equation (8) under a constraint on the compression ratio given by Equation (12)(a):

$$\text{Compression Ratio} = \frac{b}{\overline{b} + \left(\sum_{i=1}^{k} b_i + kb\right)/N} > C \qquad (12)(a)$$

where $\overline{b}$ is the average codeword length, i.e., Equation (12)(b):

$$\overline{b} = \frac{1}{N}\sum_{i=1}^{k}|C_i|b_i \qquad (12)(b)$$

Solving this optimization with a constraint on the compression ratio for any arbitrary variable-length binary code is too complex in general since the average codeword length can be arbitrary depending on the clustering output. However, it can be simplified if optimal codes, such as, e.g., a Huffman code, are assumed to be employed after clustering. In particular, since optimal coding closely achieves the lower limit of the average codeword length of a source, i.e., entropy, the average codeword length $\overline{b}$ can be approximated as shown in Equation (12)(c):

$$\overline{b} \approx H = -\sum_{i=1}^{k} p_i \log_2 p_i \qquad (12)(c)$$

where H is the entropy of the quantized network parameters after clustering (i.e., the "source"), given that $p_i = |C_i|/N$ is the ratio of the number of network parameters in cluster $C_i$ to the number of all the network parameters (i.e., the "source distribution"). Assuming that $N \gg k$, the term in the denominator of Equation (12)(a) approximates to zero as shown in Equation (12)(d):

$$\frac{1}{N}\left(\sum_{i=1}^{k} b_i + kb\right) \approx 0 \qquad (12)(d)$$

From Equations (12)(c) and (12)(d), the constraint in Equation (12)(a) can be altered to an entropy constraint given by Equation (12)(e):

$$H = -\sum_{i=1}^{k} p_i \log_2 p_i < R \qquad (12)(e)$$

where $R \approx b/C$.

In summary, assuming that optimal/entropy coding is employed after clustering, a constraint on the entropy of the clustering output can approximately replace a constraint on the compression ratio. Then, the network quantization problem is translated into a quantization problem with an entropy constraint, which is called as entropy-constrained scalar quantization (ECSQ) in information theory.

Two efficient heuristic solutions for ECSQ of network quantization are described in the following subsections, i.e., uniform quantization and an iterative algorithm similar to Lloyd's algorithm for k-means clustering.

C. Uniform Quantization

Uniform quantization is the optimal high-resolution entropy-constrained scalar quantizer regardless of the source distribution for the mean square error criterion, implying that it is asymptotically optimal in minimizing the mean square quantization error for any random source with a reasonably smooth density function as the resolution becomes infinite, i.e., when the number of clusters $k \to \infty$. See Gish, Herbert, and John Pierce. "Asymptotically efficient quantizing," *IEEE Transactions on Information Theory* 14.5 (1968): 676-683. ("Gish & Pierce 1968"), which is incorporated herein by reference in its entirety.

Uniform quantization is a very simple scheme since clusters are determined by uniformly spaced thresholds and their representative values (cluster centers) are obtained by taking, for example, the mean (or the Hessian-weighted mean) of the network parameter members in each cluster.

Even though the uniform quantization is asymptotically optimal, it was observed in simulations that it still yields good performance when employed for network quantization. Thus, uniform quantization is effective for network quantization when a variable-length entropy encoding (e.g., Huffman or LZW encoding) is employed to encode quantized values at the end after clustering.

Figure 7:
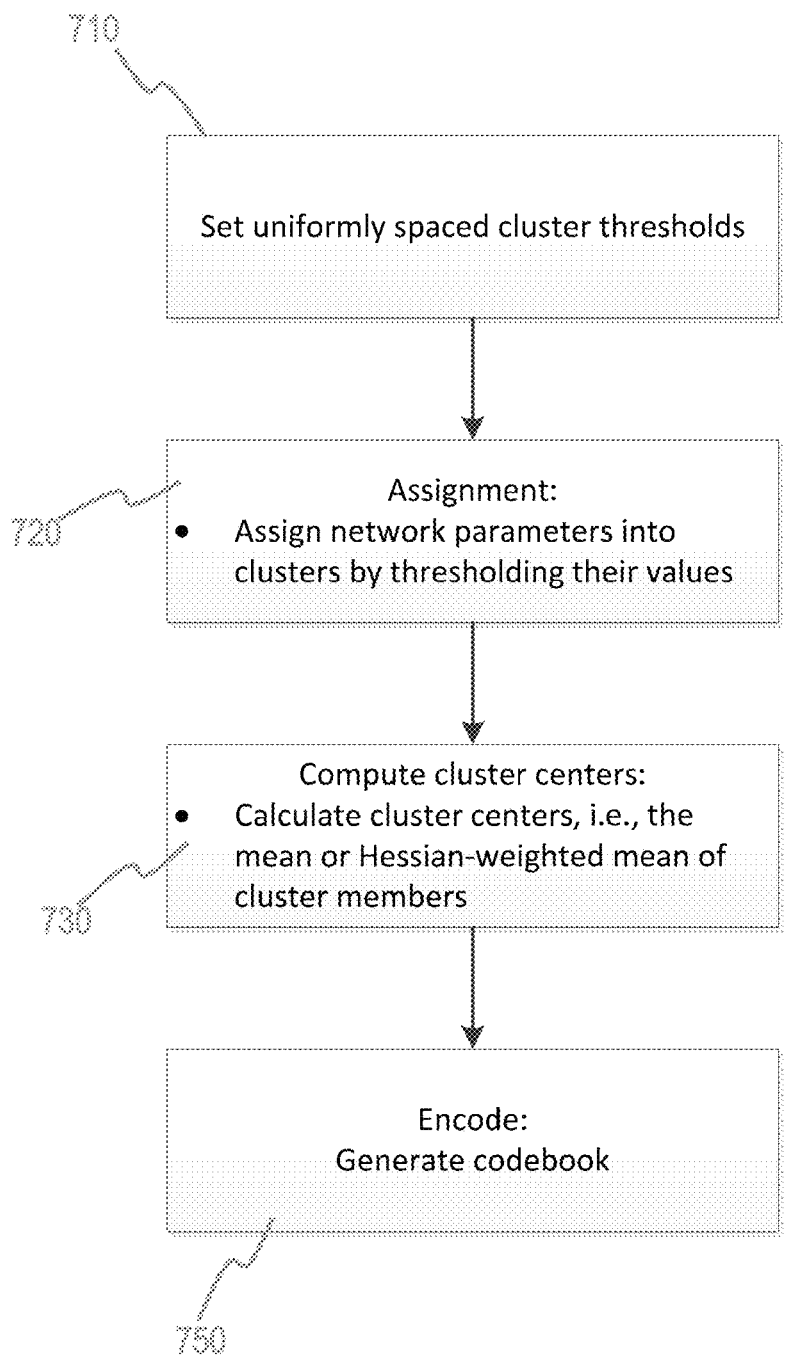
FIG. 7 illustrates an exemplary flowchart for performing uniform quantization, according to one embodiment.

FIG. 7 illustrates au exemplary flowchart for performing uniform quantization, according to one embodiment.

In FIG. 7, uniformly spaced cluster thresholds are set in order to divide the network parameters into clusters in 710. The network parameters are then assigned into their clusters by thresholding their values at 720. In 730, the representative values are calculated for each cluster. In this embodiment, the representative value of each cluster is set to be the calculated mean (or the calculated Hessian-weighted mean) of the network parameter members of the cluster. After uniform quantization, some clusters could be empty. In 750, the network parameters are encoded/compressed by the coding embodied in the generated codebook. In this embodiment, Huffman encoding is used to encode the quantized values into variable-length codewords for the generated codebook.

A performance comparison of uniform quantization with non-weighted means and uniform quantization with Hessian-weighted means can be found in Appendix A.3 of Choi et al. 2016, which is incorporated herein by reference in its entirety.

D. Iterative Algorithm to Solve ECSQ

Another scheme proposed to solve the ECSQ problem set forth in Sect. II.B above is an iterative algorithm, which is similar to Lloyd's algorithm for k-means clustering. Although this scheme is more complicated than the uniform quantization in the previous subsection, this scheme finds a local optimal point of the ECSQ problem for any given discrete input source.

The iterative algorithm is similar to the iterative algorithm for solving the general ECSQ problem provided in Chou, Philip A., Tom Lookabaugh, and Robert M. Gray. "Entropy-constrained vector quantization." *IEEE Transactions on Acoustics, Speech, and Signal Processing* 371 (1989) 31-42. ("Chou et al. 1989"), which is hereby incorporated herein by reference in its entirety, and it follows from the method of Lagrangian multipliers in Stephen Boyd and Lieven Vandenberghe, Convex Optimization, Cambridge University Press (2004), which is also hereby incorporated herein by reference in its entirety.

In order to apply this to the network quantization problem, the Lagrangian cost function $J_\lambda$ must first be defined, as shown in Equation (13)(a):

$$J_{80}(C_1, C_2, \ldots, C_k) = D + \lambda H, \quad (13)(a)$$

where the distortion measure D and entropy constraint H are as shown in Equations (13)(b):

$$D = \frac{1}{N} \sum_{j=1}^{k} \sum_{w_i \in C_j} h_{ii} \|w_i - c_j\|^2, \quad H = -\sum_{j=1}^{k} p_j \log_2 p_j \quad (13)(b)$$

The distortion measure D above can be normalized so that the Lagrangian cost function in Equation (13)(a) can be represented by the average of individual Lagrangian costs, denoted by $d_\lambda(i,j)$, for the network parameters, as shown in Equation (13)(c):

$$J_\lambda(C_1, C_2, \ldots, C_k) = \frac{1}{N} \sum_{j=1}^{k} \sum_{w_i \in C_j} \underbrace{(h_{ii}\|w_i - c_j\|^2 - \lambda \log_2 p_j)}_{=d_\lambda(i,j)} \quad (13)(c)$$

which stems from Equation (13)(d):

$$H = -\sum_{j=1}^{k} p_j \log_2 p_j = -\frac{1}{N} \sum_{j=1}^{k} |C_j| \log_2 p_j = -\frac{1}{N} \sum_{j=1}^{k} \sum_{w_i \in C_j} \log_2 P_j \quad (13)(d)$$

The network quantization problem is now reduced to finding k disjoint clusters $C_1, C_2, \ldots, C_k$ that minimize the Lagrangian cost function as follows in Equation (13)(e):

$$\underset{C_1, C_2, \ldots, C_k}{\operatorname{argmin}} \ J_\lambda(C_1, C_2, \ldots, C_k). \quad (13)(e)$$

In this optimization problem, there are two optional parameters to be selected, i.e., the Lagrangian multiplier $\lambda$ and the number of (initial) clusters k.

The Lagrangian multiplier $\lambda$ controls the entropy constraint; solving this optimization with different values of $\lambda$ results in the optimal quantization under different entropy constraints. For example, using a larger value of $\lambda$ in optimization, more penalty is effectively given for entropy H, and consequently it leads to minimized distortion under a smaller entropy constraint. The entropy constraint is related to the compression ratio while the distortion determines the performance loss. Hence, solving this optimization problem for different values of $\lambda$, a trade-off curve can be obtained between compression ratio and performance, which shows the optimal compression ratio for a given performance limit or the performance achievable for a given compression ratio. Different values of $\lambda$ provide different clustering with different average codeword lengths, when optimized and followed by Huffman encoding.

The number of clusters k in the definition of the problem in Equation (13)(e) is not equal to the number of remaining clusters after optimization since some clusters may end up to be empty due to the entropy constraint. As long as k is big enough, the optimization output is not impacted much by k since solving this problem with an entropy constraint automatically optimizes the number of non-empty clusters as well.

In practice, a value is chosen for k that is big enough and the optimization is solved for different values of $\lambda$, which will provide a curve that shows the maximum performance achievable for different compression ratios. From this curve, the point that satisfies the target performance and/or target compression ratio can be selected.

Given $\lambda$ and k, a heuristic iterative algorithm to solve this ECSQ problem for network quantization is presented in Algorithm (1) below. Note that Algorithm (1) is similar to Lloyd's algorithm for k-means clustering; the only major difference is how the network parameters are partitioned at the assignment step. In Lloyd's algorithm, the Euclidean distance (quantization error) is minimized. For ECSQ the individual Lagatrigiart cost function, i.e., $d_\lambda(i,j)$ in Equation (13)(c), is minimized instead, which includes both quantization error and expected codeword length after optimal encoding. Although Hessian-weighted quantization errors as shown in Equation (13)(b) are used in defining the cost function in this embodiment, other quantization error metrics can be used if Hessian-weights are not available or if other quantization error metrics are preferable.

---

Algorithm 1 Iterative solution for entropy-constrained network quantization

Initialization: $n \leftarrow 0$
  Initialization of k cluster centers: $c_1^{(0)}, c_2^{(0)}, \ldots, c_k^{(0)}$
  Initial assignment of each network parameters to its closest cluster:
  $C_1^{(0)}, C_2^{(0)}, \ldots, C_k^{(0)}$
  Compute initial distribution of network parameters over k clusters:
  $p_1^{(0)}, p_2^{(0)}, \ldots, p_k^{(0)}$
repeat
  Assignment:
    for all clusters $j = 1 \to k$ do
      $C_j^{(n+1)} \leftarrow \emptyset$
    end for
    for all network parameters $i = 1 \to N$ do
      Assign $w_i$ to the cluster j that minimizes the following individual Lagrangian cost:

$$C_l^{(n+1)} \leftarrow C_l^{(n+1)} \cup \{w_i\} \text{ for } l = \underset{j}{\operatorname{argmin}}\{h_{ii}|w_i - c_j^{(n)}|^2 - \lambda \log_2 p_j^{(n)}\}$$

end for
  Update:
    for all clusters $j = 1 \to k$ do
      Update the cluster center and the distibution for cluster j:

$$c_j^{(n+1)} \leftarrow \frac{\sum_{w_i \in c_j^{(n+1)}} h_{ii} w_i}{\sum_{w_i \in c_j^{(n+1)}} h_{ii}} \text{ and } p_j^{(n+1)} \leftarrow \frac{|C_j^{(n+1)}|}{N}$$

end for
    $n \leftarrow n + 1$
until Lagrangian cost function $J_\lambda$ decreases less than some threshold

---

More details concerning Algorithm (1) can be found in Appendix A2 of Choi et al. 2016, which is incorporated herein by reference in its entirety.

Figure 8:
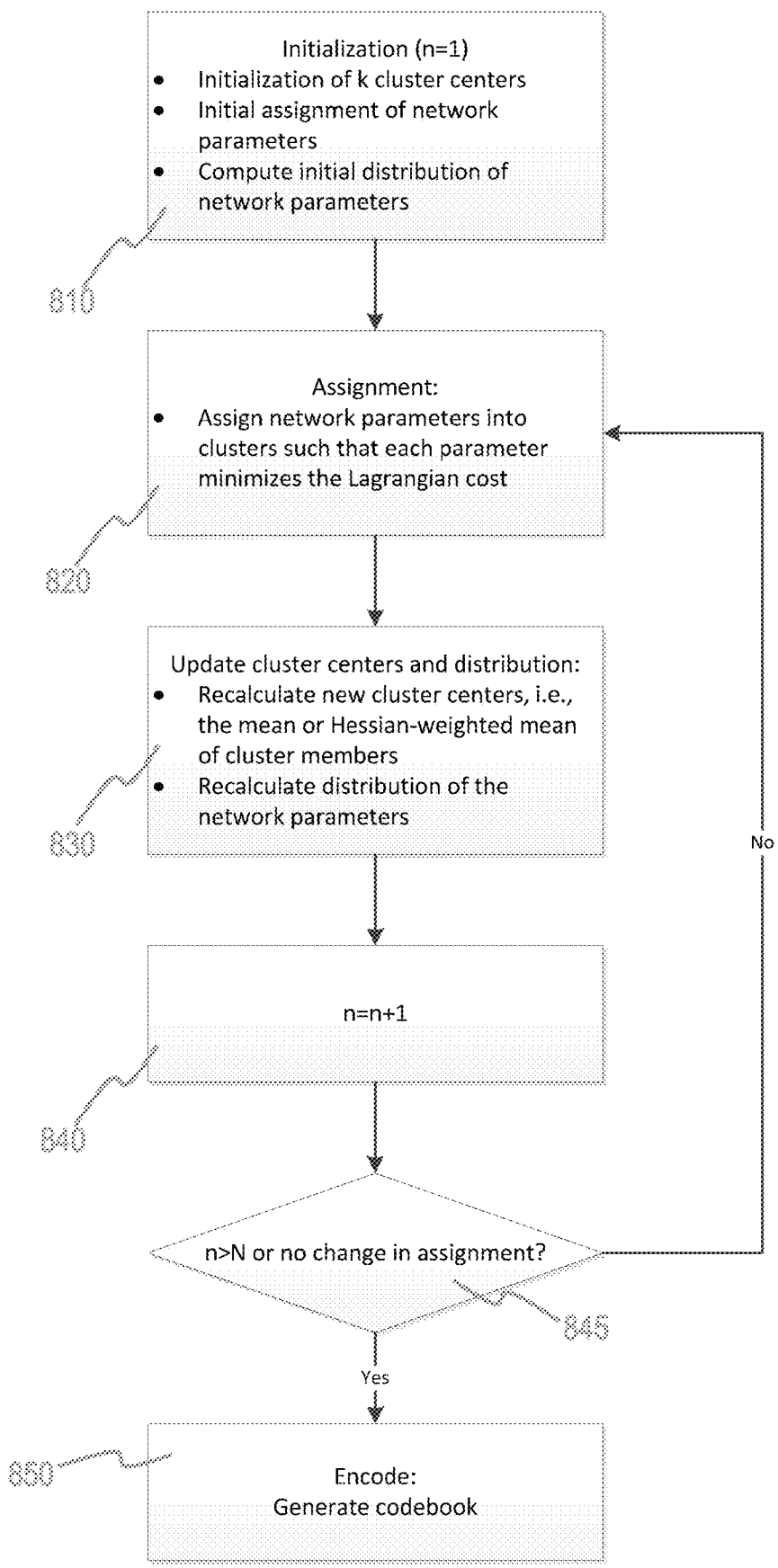
FIG. 8 illustrates an exemplary flowchart for performing an iterative algorithm for solving the ECSQ problem in regards to network quantization, according to one embodiment.

FIG. 8 illustrates an exemplary flowchart for performing an iterative algorithm for solving the ECSQ problem in regards to network quantization, according to one embodiment.

In FIG. 8, initialization is performed in 810. In this embodiment, initialization 810 includes the initialization of k cluster centers: $c_1^{(0)}, c_2^{(0)}, \ldots, c_k^{(0)}$, the initial assignment of each network parameter to the cluster $C_1^{(0)}, C_2^{(0)}, \ldots, C_k^{(0)}$ whose Hessian-weighted center is the closest to the parameter value, and the initial distribution is computed, i.e., $p_1^{(0)}, p_2^{(0)}, \ldots, p_k^{(0)}$. Assignment is performed at 820. In this embodiment, each network parameter $w_i$ is assigned in 820 to a cluster that minimizes the individual Lagrangian cost. See, e.g., Equations (13) above.

At 830, the cluster centers and distribution are updated. In other words, the new cluster centers are re-calculated, i.e., the mean (or Hessian-weighted mean) of the network parameters in each cluster are re-calculated, as well as the network parameter distributions. At 840, the number of iterations is updated ("n=n+1"). At 845, it is determined whether the iterative process has ended. More specifically, it is determined whether the number of iterations has exceeded a limit ("n>N") or there was no change in assignment at 820 (which means the algorithm has effectively converged). If it is determined that the process has ended in 845, a codebook for quantized network parameters is generated at 850. If it is determined that the process has not ended in 845, the process repeats to assignment at 820.

III. Experimental/Simulation Results for Scalar Quantization

A pre-trained 32 layer ResNet with a CIFAR10 data set was used to test a Hessian-weighted k-means clustering method and uniform quantization method according to embodiments of the present disclosure. CIFAR-10 is a labeled subset of a dataset with 80 million tiny images, which were collected by Alex Krizhevsky, Vinod Nair, and Geoffrey Hinton, CIFAR-10 consists of 60,000 32×32 color images in 10 classes, with 6000 images per class. There are 50,000 training images and 10,000 test images. ResNet (He et al. 2015) is the state-of-the-art deep convolutional neural network for image classification. They increase the depth of the neural network while adding identity path for better convergence. The pre-trained ResNet achieves 92.58% accuracy. The total number of network parameters is 464, 154.

Figure 9A:
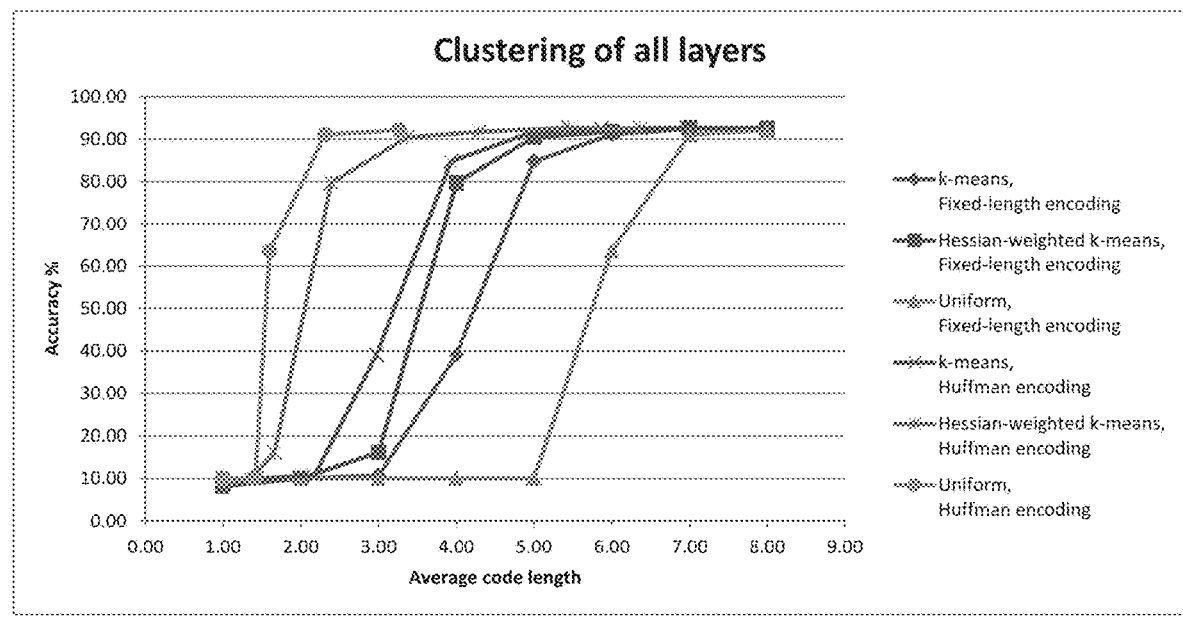
FIG. 9A illustrates an exemplary plot of code lengths for various network quantization methods, according to one embodiment.
Figure 9B:
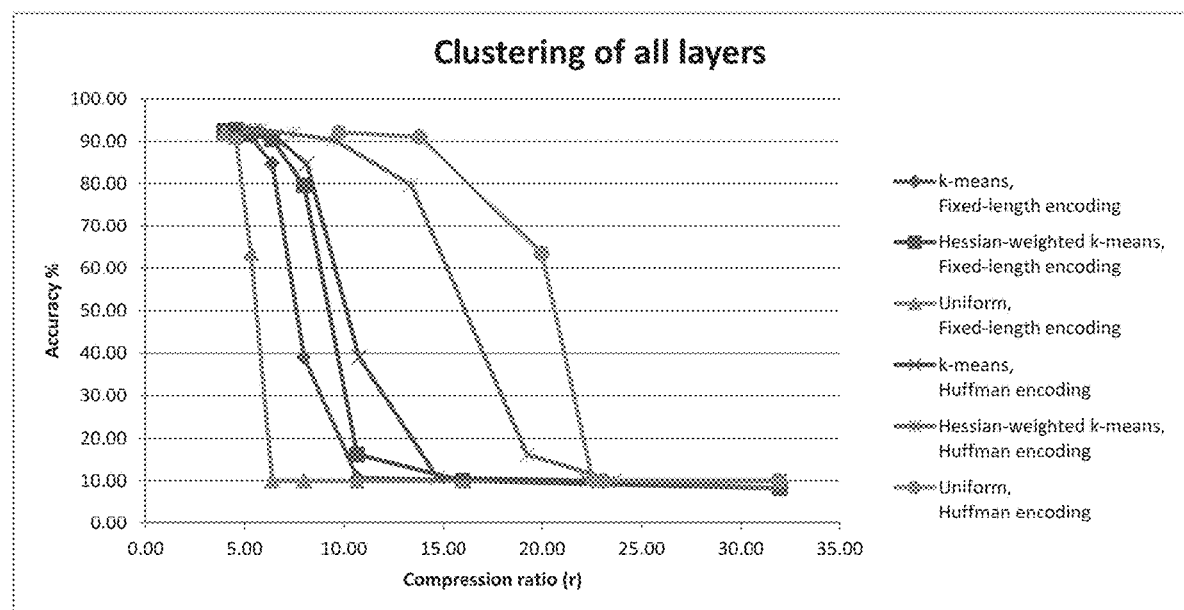
FIG. 9B illustrates an exemplary plot of compression ratios for various network quantization methods, according to one embodiment.
Figure 9C:
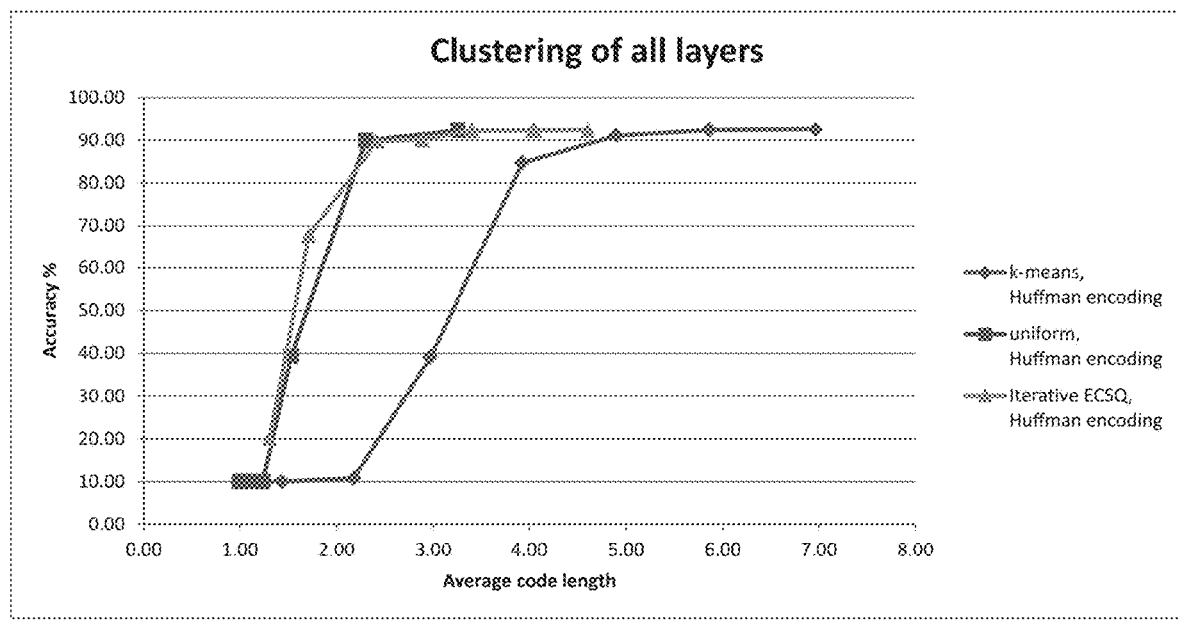
FIG. 9C illustrates another exemplary plot of code lengths for various network quantization methods, according to one embodiment.

FIG. 9A illustrates an exemplary plot of code lengths for various network quantization methods, according to one embodiment. FIG. 9B illustrates an exemplary plot of compression ratios for various network quantization methods, according to one embodiment. The network quantization methods in FIGS. 9A and 9B include k-means clustering, Hessian-weighted k-means clustering, and uniform quantization. FIG. 9C illustrates another exemplary plot of code lengths for various network quantization methods, according to one embodiment. The network quantization methods in FIG. 9C include k-means clustering, uniform quantization, and quantization with an iterative ECSQ algorithm.

IV. Conclusions Regarding Scalar Quantization

As described in detail above, this disclosure provides, inter alia, (1) utilizing the second-order partial derivatives, i.e., the diagonal of Hessian matrix, of the loss function with respect to network parameters as a measure of the importance of network parameters and (2) solving the network quantization problem under a constraint of the actual compression ratio resulted in by the specific binary encoding scheme employed.

Moreover, in the present disclosure, it is derived that the performance loss due to network quantization can be minimized locally by minimizing the Hessian-weighted distortion due to quantization. From this result, Hessian-weighted k-means clustering is disclosed for network quantization when fixed-length binary encoding is employed. Furthermore, the Hessian-weighted k-means clustering method for network quantization is described, where the second-order derivatives of the network loss function with respect to network parameters are used as weights in weighted k-means clustering for network parameter clustering.

One drawback of using Hessian-weighted quantization methods is that the second-order derivatives (the diagonal elements of the Hessian matrix) of the network loss function needs to be computed. However, the present disclosure also shows that alternatives to Hessian-weighting can be computed during the training stage when the gradients are being calculated. In addition, an efficient way of computing the diagonal of Hessian is discussed, which is of the same order of complexity as computing the gradient. Moreover, simulation results showed that even using a small size of data set is sufficient to yield good approximation of Hessian and lead to good quantization results.

The present disclosure also shows that the optimization problem for network quantization under a constraint on the compression ratio can be reduced to an entropy-constrained scalar quantization (ECSQ) problem when entropy coding (i.e., optimal variable-length coding whose average codeword length for a given source approaches to the entropy of the source) is employed.

Two efficient heuristic solutions for ECSQ are disclosed for network quantization; uniform quantization and an iterative algorithm similar to Lloyd's algorithm. For uniform quantization, uniformly spaced thresholds are set to divide network parameters into clusters. After determining the clusters, the representative value of each cluster is set to be the mean or the Hessian-weighted mean of the members of the cluster. Even though uniform quantization is asymptotically optimal, simulations indicated that it still yields good performance when employed for network quantization. Besides the iterative algorithm similar to Lloyd's algorithm to solve the ECSQ problem for network quantization, a Hessian-weighted version of the iterative algorithm is also described, where Hessian-weighted quantization loss is used as the objective function to be minimized in the optimization.

The present disclosure also describes using a function of the second moment estimates of gradients of the network parameters as an alternative to Hessian-weighting. This can be used with an advanced SGD optimizer. The advantage of using the second moment estimates of gradients with an advanced SGD optimizers is that the second moment estimates are computed while training/fine-tuning and thus can simply be stored for later use (during network quantization) with no additional computation. This makes the Hessian-weighting more feasible for deep neural networks, which have millions of parameters.

The network quantization schemes of the present disclosure can be applied for quantizing network parameters of all layers together at once, rather than performing layer-by-layer network quantization. Thus, Hessian-weighting can handle the different impact of quantization errors properly not only within layers but also across layers.

In another embodiment, a universal entropy code such as the LZW can be employed. One advantage of LZW compression is that it requires a single pass through data, and both encoders and decoder can build the dictionary on the fly, whereas the Huffman encoding requires two passes on the data, one to calculate symbol frequencies, and the other for encoding, and the dictionary needs to be generated/sent. In embodiments using variable-to-fixed entropy encoding such as LZW instead of fixed-to-variable length entropy encoding such as the Huffman code, the disclosed quantization schemes using entropy constrained scalar quantization still hold.

In other embodiments, dithered scalar quantization can be used (see, e.g., Zhao, Qian, Hanying Feng, and Michelle Effros, "Multiresolution source coding using entropy constrained dithered scalar quantization." *IEEE Data Compression Conference (DCC) Proceedings* 2004, which is incorporated herein in its entirety), where the weights or network parameters are dithered by a constant factor before quantization, followed by uniform scalar quantization, and finally lossless entropy encoding, such as by the LZW code.

V. Vector and Universal Quantization

In general, embodiments of the present disclosure can be used to quantize network parameters of a neural network in order to reduce the storage (memory) size for the network while minimizing performance degradation. The techniques described in this disclosure are generally applicable to any type of neural network.

Scalar quantization methods for network quantization are discussed above, and are an improvement over, for example, conventional k-means clustering which has been used for layer-by-layer network quantization. See, e.g., Gong et al. 2014 and Han et al. 2015b.

In this section, vector and universal quantization schemes for network quantization are described. It is known that vector quantizers may require lower code rates than scalar quantizers in data compression. See, e.g., Gray, R., "Vector quantization," IEEE ASSP Magazine, vol. 1, no. 2, pp. 4-29, 1984 ("Gray 1984"), which is hereby incorporated by reference in its entirety. For neural networks, vector quantization was examined in Gong et al. 2014, but that examination was limited to k-means clustering followed by fixed-length binary coding.

In this section, the entropy-constrained scalar quantization (ECSQ) solutions discussed above in relation to scalar quantization are generalized to vector quantization, including, for example, entropy-constrained vector quantization (ECVQ).

Universal quantization of network parameters are also explored in this section. Universal quantization is randomized uniform quantization with dithering. See, e.g., Ziv, J. "On universal quantization," IEEE Transactions on Information Theory, vol. 31, no. 3, pp. 344-347, 1985 ("Ziv 1985) and Zamir et al., "On universal quantization by randomized unifombilattice quaritizers," IEEE Transactions on Information Theory, vol. 38, no. 2, pp. 428-436, 1992 (Zamir et al. 1993), both of which are hereby incorporated by reference in their entirety. Normally, the advantage of an optimal entropy-constrained vector quantizer over a simple universal quantizer is quite small universally, i.e., for any sources and rates. See id.

However, in embodiments of the present disclosure, universal quantization is combined with universal source coding algorithms, such as, for example, Lempel-Ziv-Weich (LZW) (see, e.g., Welch, T. A., "A technique for high-performance data compression," Computer, vol. 6, no, 17, pp. 8-19, 1984 ("Welch 1984"), which is hereby incorporated by reference in its entirety), g zip (see http://www.gzip.org/), or bzip2 (see http://www.bzip.org/).

In the present disclosure, a universal network compression method is described, which is expected to perform near the optimum universally—i.e., for any neural networks and any compression ratio constraints.

In the present disclosure, a fine-tuning method of shared quantized vectors after vector quantization of network parameters is disclosed. A fine-tuning method of shared quantized values was presented in Han et al. 2015b, employing scalar k-means clustering for network quantization. In Han et al. 2015b, the average gradient of the network loss function with respect to network parameters was computed for every cluster and used to update their shared quantized values (cluster centers).

By contrast, in embodiments of the present disclosure, when vector quantization is employed for network quantization, each dimensional element of a quantized vector is fined-tuned separately. That is, if there are k clusters of n-dimensional vectors, then the network parameters can be effectively divided into kn groups and their shared quantized values can be fine-tuned separately by using the average gradient in each group.

A fine-tuning algorithm of quantized values or vectors after universal quantization is also described herein. In universal quantization, the uniform or lattice quantization output is actually fine-tuned before cancelling random dithering values. Similar to a system without dithering, the average gradient with respect to network parameters is computed for every cluster and in every dimension and used to update the quantization output. In the embodiment described herein, the gradients are computed with respect to the quantized parameters after cancelling random dithering, while the fine-tuned values are the ones before cancelling random dithering.

A. Vector Quantization

As discussed above, it is well known that vector quantizers may require lower code rates than scalar quantizers in data compression (see, e.g., Gray 1984) and vector quantization were examined for neural networks in Gong et al. 2014, but the examination was limited to k-means clustering followed by fixed-length binary coding only. In the present disclosure, scalar quantization solutions such as, e.g., ECSQ, are generalized to vector quantization.

Although vector quantization provides a better rate-distortion trade-off in theory, vector quantization in practice is generally more complex to implement than scalar quantizers. In the present embodiment of the present disclosure, the simple lattice quantizer, i.e., the multi-dimensional uniform quantizer, is not only simple to implement but also shows good performance in experiments.

For vector quantization, given a set of N network parameters, $\{w_i\}_{i=1}^N$, a set of n-dimensional vectors $\{v_i\}_{i=1}^{\lceil N/n \rceil}$ is generated. An example of such construction is given by Equation (14):

$$v_i = [w_{n(i-1)+1} w_{n(i-1)+2} \cdots w_{ni}]^T \quad (14)$$

for $1 \le i \le \lceil N/n \rceil$, where $w_j = 0$ for $N < j \le \lceil N/n \rceil n$.

The n-dimensional vectors are partitioned into k clusters, where $C_i$ is the set of vectors in cluster i. A codeword is assigned to each vector, i.e., every n network parameters are represented by a codeword, where $b_i$ is the number of bits in the codewords assigned to the vectors in cluster i (for $1 \le i \le k$). The codebook stores k binary codewords (of $b_i$ bits each) and corresponding n-dimensional quantized vectors (of nb bits each).

Assuming that each network parameter consists of b bits before quantization, the compression ratio for vector quantization is given by Equation (15):

$$\text{Compression ratio} = \frac{Nb}{\sum_{i=1}^{k}(|C_i|+1)b_i + knb} \quad (15)$$

The codebook size, $\sum_{i=1}^{k} b_i + knb$, is roughly proportional to n, i.e., the number of dimensions of vector quantization, implying that the codebook overhead becomes more considerable as the dimension n increases and that, after a certain point, dimension n becomes the dominant factor that degrades the compression ratio. Thus, the benefits of vector quantization decrease as the number of vector dimensions increases past a certain point (i.e., when the increase in codebook overhead becomes a dominant factor in degrading the compression ratio).

B. Entropy-Constrained Vector Quantization (ECVQ)

As discussed above in terms of scalar quantization (ECSQ), entropy-constrained network quantization is an efficient network quantization method given a compression ratio constraint when followed by entropy coding. Similar to ECSQ, the optimal vector quantization given an entropy constraint may be called entropy-constrained vector quantization (ECVQ). In the present disclosure, the ECSQ solutions described above are generalized and expanded to include ECVQ solutions.

Figure 10:
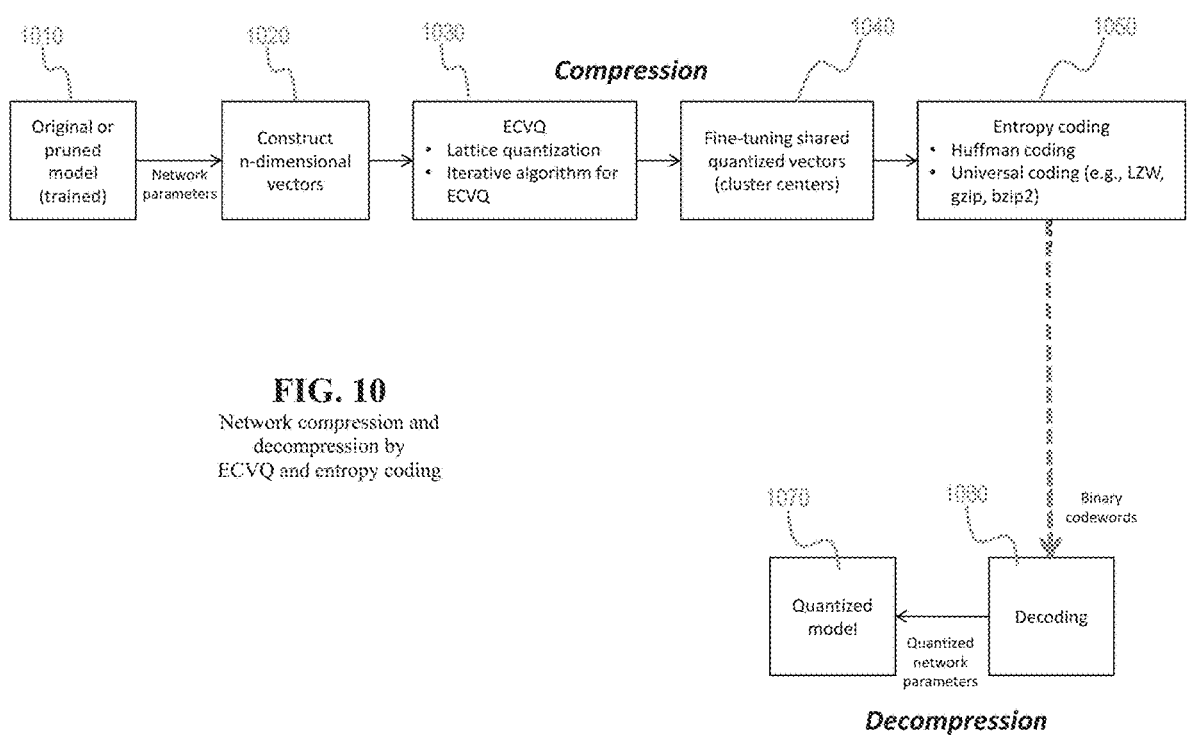
FIG. 10 illustrates an exemplary block diagram of network compression and decompression by entropy-constrained vector quantization (ECVQ) with entropy coding, according to embodiments of the present disclosure.

FIG. 10 illustrates an exemplary block diagram of network compression and decompression by ECVQ and entropy coding, according to embodiments of the present disclosure. More specifically, compression occurs at 1010, 1020, 1030, 1040, and 1050, after which the compressed binary codewords are decompressed at 1060 and 1070.

In compression, the trained original or pruned model is provided at 1010. At 1020, the set of network parameters are used to generate/construct the n-dimensional vectors, such as shown by the example of the set of constructed n-dimensional vectors $\{v_i\}_{i=1}^{\lceil N/n \rceil}$ in Equation (14) above. At 1030, ECQV is performed by lattice quantization or by use of an iterative algorithm (both of which are discussed in greater detail below). The shared quantized vectors (which correspond to the cluster centers) are fine-tuned at 1040, as is also discussed in greater detail below. At 1050, the quantized vectors are entropy coded using, for example, Huffman coding or universal coding, such as LZW, gzip, or bzip (or any of their later and/or improved versions, such as bzip2).

The compressed, entropy coded, and vector quantized binary codewords are then decompressed. During decompression, the received binary codewords are first decoded at 1060, and the quantized network parameters are used to re-create the quantized model at 1070.

C. Lattice Quantization (Multi-Dimensional Uniform Quantization)

Optimal high resolution ECVQ that minimizes the mean square quantization error has a lattice-shape codebook as the resolution goes to infinity. See, e.g., Gish & Pierce 1968; see also Gersho, A., "Asymptotically optimal block quantization," IEEE Transactions on Information Theory, vol. 25, no. 4, pp. 373-380, 1979 ("Gersho 1979"), which is hereby incorporated by reference herein in its entirety. This problem in increasing asymptopicity and other such qualities make such optimal high resolution ECVQs unsuitable for practical wide-spread use at the present time (although it still may be used together with aspects of the present disclosure; however, future improvements may lead to even greater suitability and desirability to use such optimal high resolution ECVQ schemes with aspects of the present disclosure).

In one embodiment, similar to the uniform quantizer, the following process is provided for a relatively simple lattice quantizer for vector quantization of network parameters:

1. Construct n-dimensional vectors from network parameters (using, e.g., Equation (14));
2. Set uniformly spaced thresholds in each dimension of the n-dimensional Euclidean space;
3. Group n-dimensional vectors into clusters; and
4. Obtain quantized vectors (i.e., cluster centers) by taking the mean or the Hessian-weighted mean of the vectors in each cluster.

D. Iterative Algorithm to Solve ECVQ

The iterative solution for ECVQ simply follows from the iterative solution for ECSQ (see, e.g., Sect, II.D above) by replacing the scalar network parameters with the n-dimensional vectors constructed from the scalar network parameters. Given the iterative solution for ECSQ above, the generalization is straightforward and thus the details are omitted here.

E. Fine-Tuning of Shared Quantized Vectors

Like above, where shared quantized values were fine-tuned after scalar quantization of network parameters, herein shared quantized vectors are fine-tuned after vector quantization of network parameters. Each dimensional element of a shared quantized vector is fined-tuned separately. That is, if there are k clusters of n-dimensional vectors, then the network parameters are effectively divided into kn groups and their shared quantized values are fine-tuned individually. The average gradient of the network loss function with respect to network parameters in each group is used for fine-tuning their shared quantized value.

Let $C_{i,j}$ for $1 \leq i \leq k$ and $1 \leq j \leq n$ be the set of network parameters that are the jth dimensional elements of vectors in cluster i, as defined by Equation (16)(a):

$$C_{i,j} = \{w_{n(i-1)+j} : \forall v_i \in C_i, v_i = [w_{n(i-1)+1} w_{n(i-1)+2} \ldots w_{ni}]\} \quad (16)(a)$$

Moreover, let $c_i[c_{i,1} c_{i,2} \ldots c_{i,n}]^T$ be the shared quantized vector (cluster center) for cluster i. All network parameters in $C_{i,j}$ are quantized to the same value $C_{i,j}$. Each element of this shared quantized vector is fine-tuned, e.g., with the stochastic gradient descent (SGD) method given by Equation (16)(b):

$$c_{i,j}(t) = c_{i,j}(t-1) - \eta g_{i,j}(t-1) \quad (16)(b)$$

where t is the iteration number, η is the learning rate, and $g_{i,j}$ is the average gradient of the network loss function L(w) with respect to network parameters in $C_{i,j}$, i.e., as given by Equation (16)(c):

$$g_{i,j}(t-1) = \frac{1}{|C_{i,j}|} \sum_{w_l \in C_{i,j}} \frac{\partial L(w)}{\partial w_l}\bigg|_{w=\overline{w}(t-1)} \quad (16)(c)$$

where the gradient $g_{i,j}$ is evaluated at the values given by Equations 16(d) and 16(e):

$$w = \overline{w}(t-1) = [\overline{w}_1(t-1) \overline{w}_2(t-1) \ldots \overline{w}_N(t-1)] \quad (16)(d)$$

$$\overline{w}_i(t-1) = c_{i,j}(t-1) \quad (16)(e)$$

where $w_i \in C_{i,j}$ for $1 \leq i \leq N$.

F. Universal Quantization (Randomized Uniform/Lattice Quantization)

Uniform quantizers and lattice quantizers are widely used since they are simple to implement and also shown to be efficient in many examples of data compression. However, their performance is proven to approach to the entropy limit only asymptotically as the quantization resolution goes to infinity, i.e., as the number of clusters k→∞. For finite resolutions, i.e., for a finite number of clusters k, uniform quantizers and lattice quantizers are not guaranteed to perform close to optimal because the quantization error depends on the source distribution.

By contrast, "universal quantization" randomizes the source with a uniformly distributed dither, and was originally proposed for achieving good performance within a guaranteed bound from the entropy rate for any source distribution. See, e.g., Ziv 1985. Dithering is the intentional application of noise to randomize quantization error, commonly by using a uniformly distributed, and yet random, variable often labelled z (or sometimes u, as below). See, e.g. id, pp. 345-346. Dithering m the effects of large-scale quantization error.

According to an embodiment of the present disclosure, universal quantization is performed by first randomizing the network parameters uniform randomized dithering, and then the dithered network parameters undergo uniform or lattice quantization. Finally, random dithering values are subtracted from the quantized vectors after uniform or lattice quantization (after reception, for decoding).

In embodiments for universal quantization according to the present disclosure, both the sender and recipient must have some mechanism for sharing the same random dithering values, so that the random dithering values used in encoding can be cancelled out after reception by the decoder using the same random dithering values.

In one embodiment, the random dithering values are not actually shared by calculating and then sending the calculated values between the encoder and decoder, but rather the same pseudo-random number generator is used by both the encoder and decoder to generate the same dithering values at both ends of encoding/decoding. See, e.g., pseudo-random number generator 1100 in FIG. 11, discussed below.

Using formal notation, universal quantization may be represented by Equation (17):

$$\overline{w} = Q_n(\tilde{w}) - u = Q_n(w+u) - u, \quad (17)$$

where: $w = [w_1 \, w_2 \, \ldots \, w_N]^T$ is a column vector consisting of the original network parameters before quantization;
$\tilde{w} = [\tilde{w}_1 \tilde{w}_2 \ldots \tilde{w}_N]^T$ is a column vector consisting of the randomized network parameters by uniform random dithering;
$\overline{w} = [\overline{w}_1 \overline{w}_2 \ldots \overline{w}_N]^T$ is a column vector consisting of the final quantized network parameters from universal quantization;
$u = [u_1 \, u_2 \, \ldots \, u_N]^T$ is a column vector consisting of the random dithering values, where $u_i = u_{\lceil i/m \rceil}$; and
$Q_n$ denotes the n-dimensional uniform quantizer.

According to one embodiment of the present disclosure, the following universal quantization method for network parameters is provided:

1. Given a positive integer m, network parameters $w_1, w_2, \ldots, w_N$ are randomized in Equation (18) as follows:

$$\tilde{w}_i w_i + U_{\lceil i/m \rceil} \quad (18)$$

where $U_1, U_2, \ldots, U_{\lceil N/m \rceil}$ are independent and identically distributed uniform random variables and the interval of the uniform distribution is $[-\Delta/2, \Delta/2]$ where $\Delta$ is the quantization step size of the following uniform or lattice quantization. Based on the above, it can be seen that the random dithering values change by every m network parameters 2. Uniform or lattice quantization is performed for the dithered network parameters $\tilde{w}_1, \tilde{w}_2, \ldots, \tilde{w}_N$ by:
   (a) given the number of dimensions n for the vectors, setting uniformly spaced thresholds for each of the n dimensions of Euclidean space;
   (b) grouping the n-dimensional vectors into clusters using the thresholds; and
   (c) obtaining cluster centers for each cluster by taking, for example, the mean or the Hessian-weighted mean of the grouped n-dimensional vectors in each cluster.

3. Cancelling random dithering values from the uniform or lattice quantization output to obtain the final quantized network parameters.

Figure 11:
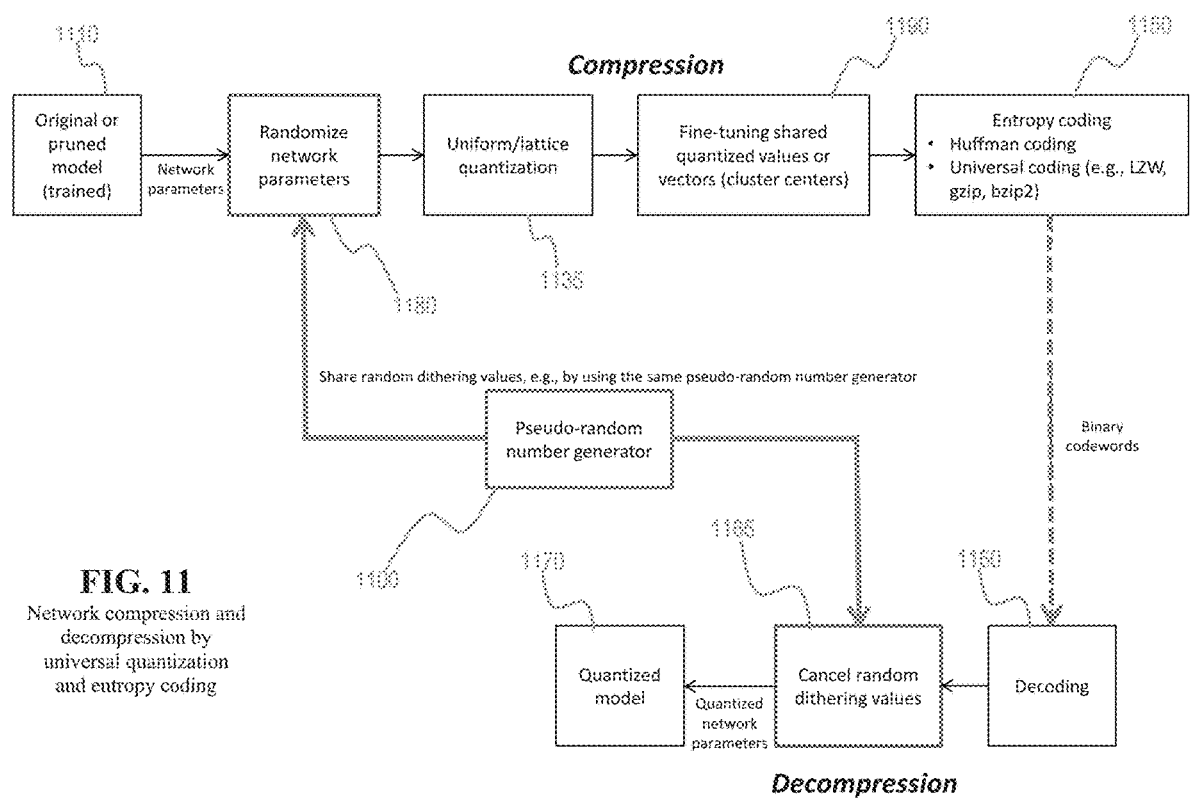
FIG. 11 illustrates an exemplary block diagram of network compression and decompression by universal quantization and entropy coding, according to embodiments of the present disclosure.

FIG. 11 illustrates an exemplary block diagram of network compression and decompression by universal quantization and entropy coding, according to embodiments of the present disclosure. More specifically, compression occurs at 1110, 1180, 1135, 1190, and 1150, after which the compressed binary codewords are decompressed at 1160, 1165, and 1170. Reference numerals in FIG. 11 which are similar to reference numerals in FIG. 10 concern substantially similar functions and are not necessarily described again here or to the same degree.

At 1180 in FIG. 11, the network parameters from the trained original/pruned model at 1110 are randomized using independent and identically distributed uniform random dithering variables as shown and described in reference to Equation (18) above, and as generated by pseudo-random number generator 1100. At 1135, uniform or lattice quantization is performed on the dithered network parameters from 1180. Using the number of dimensions n for the vectors, uniformly spaced thresholds are set for each of the n dimensions of Euclidean space and the n-dimensional vectors are grouped into clusters, and the cluster centers are obtained for each cluster by taking, for example, the mean or the Hessian-weighted mean of the vectors for each cluster at 1135.

At 1190, the quantized vectors (cluster centers) from 1135 are fine-tuned, as described in detail in the next section. At 1150, entropy coding is performed to create binary codewords which are decoded at 1160. At 1165, the decoder uses the same pseudo-random number generator 1100 to cancel out the independent and identically distributed uniform random dithering variables applied to the network variables at 1180. Lastly, the quantized network parameters from 1165 are used to re-create the quantized model at 1170.

G. Fine-Tuning of Quantized Values/Vectors after Uniform Quantization

In universal quantization, fine-tuning is not as straightforward due to the random dithering values, which are added before quantization and cancelled out at the end of quantization.

Similar to a quantization system without dithering, the average gradient with respect to network parameters is computed for every cluster and in every dimension and then the computed average gradient is used to update the quantization output. By contrast, however, the gradients are computed with respect to the quantized parameters after cancelling the random dithering, while the values are fine-tuned before cancelling random dithering.

Similar to Equations 16(a) through (16)(d) above, $c_i = [c_{i,1}, c_{i,2} \ldots c_{i,n}]^T$ is the shared quantized vector (cluster center) for cluster i after n-dimensional uniform quantization (in this case, obtained before subtracting random dithering values), and each element of this quantized vector is fine-tuned with, e.g., the SGD method given by Equation (19)(a);

$$c_{i,j}(t) = c_{i,j}(t-1) - \eta g_{i,j}(t-1), \quad (19)(a)$$

where $g_{i,j}$ is the average gradient of the network loss function L(w) with respect to network parameters in set $C_{i,j}$ given by Equation (19)(b):

$$g_{i,j}(t-1) = \frac{1}{|C_{i,j}|} \sum_{w_l \in C_{i,j}} \frac{\partial L(w)}{\partial w_l}\bigg|_{w = \overline{w}(t-1)+u} \quad (19)(b)$$

which is evaluated at $w = \overline{w}(t-1) + u$.

As noted above, the average gradient is evaluated after cancelling random dithers, while the updated shared quantized values/vectors are obtained before subtracting random dithers.

H. Universal Source Coding

According to an embodiment of the present disclosure, the combination of universal network quantization with universal source coding is provided, which provides a universal network compression framework which is expected to be effective for any neural networks and for any compression ratio constraints.

Examples of universal source coding include, as mentioned above, Lempel-Ziv-Welch (LZW) (see, e.g., Welch 1984), gzip, or bzip2, as well as other Lempel and Ziv algorithms, such as LZ77, LZ78, LZSS, LZMA, and others, as would be known to one of ordinary skill in the art.

Universal source coding is known to achieve the entropy rate for any source, and it is more convenient than Huffman coding since it does not require the knowledge of the source distribution. Furthermore, universal source coding algorithms may perform better than Huffman coding because universal source codes utilize the dependency, if any exists, between source symbols by using a single codeword for multiple symbols. Huffman coding does not take into account the dependency of source symbols, instead effectively assuming the independence of each source symbol, and cannot use a single codeword for more than one source symbol.

When universal source coding is applied after network quantization, the quantized network parameters are considered before cancelling random dithering values. Optionally, s-dimensional quantized vectors can be constructed from the quantized network parameters. Distinct quantized values/vectors are treated as the input alphabet (source symbols) for the universal source coding. Accordingly, the quantized values/vectors are converted into a list of source symbols, upon which the universal source coding is applied. Lookup tables are needed for encoding and decoding. However, the overhead for this is rather small.

Figure 12:
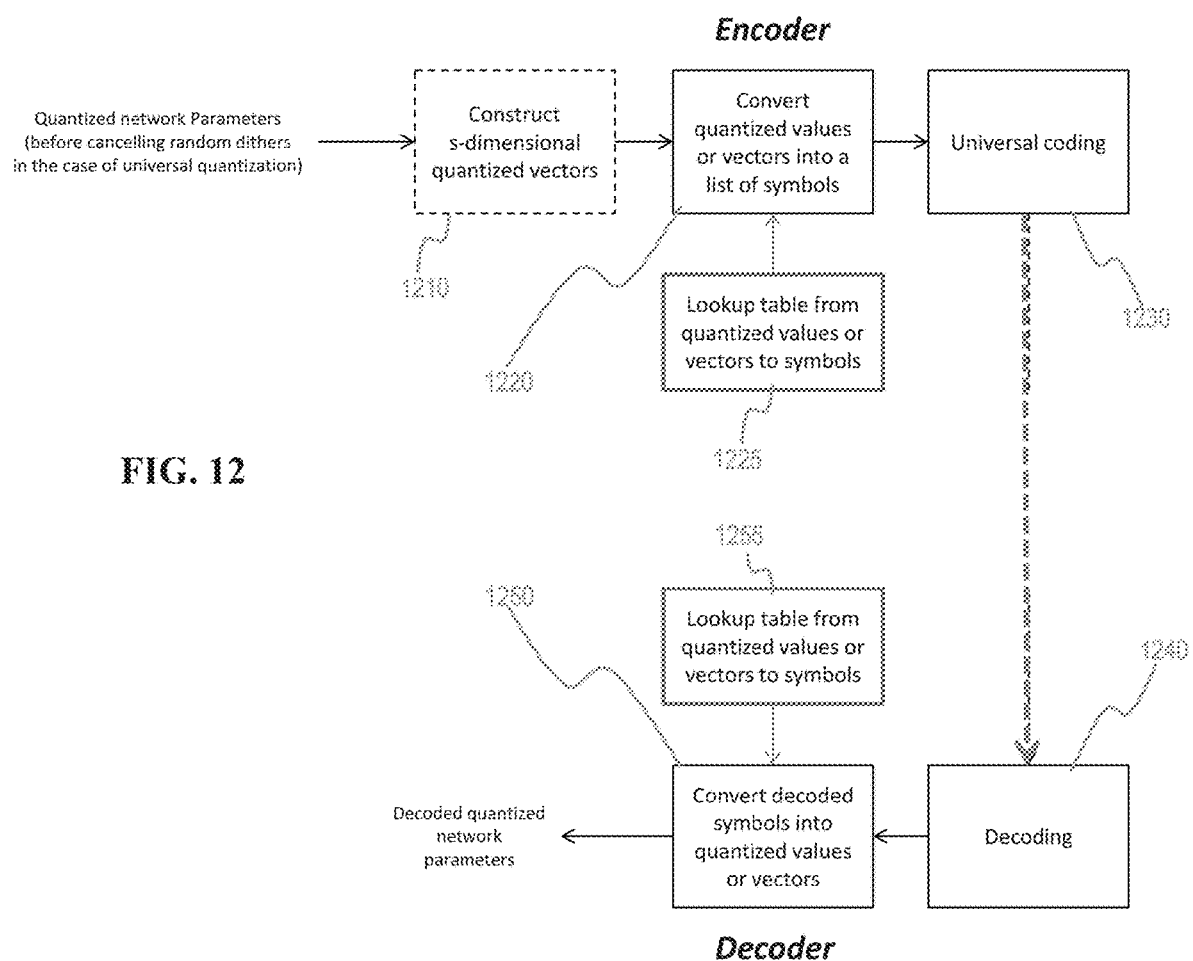
FIG. 12 illustrates an exemplary block diagram of an encoder and decoder for universal source coding after universal network quantization, according to embodiments of the present disclosure.

FIG. 12 illustrates an exemplary block diagram of an encoder and decoder for universal source coding after universal network quantization, according to embodiments of the present disclosure.

At 1210, the quantized network parameters are used to construct the s-dimensional quantized vectors (before cancelling the random dithers, in the case of universal quantization). As discussed above and indicated by the dashed lines forming box 1210, 1210 is an optional procedure. At 1220, the quantized vectors/values are converted into a list of symbols using lookup table 1225, which has the corresponding symbols for the quantized vectors/values. Universal coding is applied to the symbols in 1230, and decoding is performed on the universally coded symbols at 1240. At 1250, the decoded symbols from 1240 are converted back into quantized vectors/values using the lookup table 1255, which has the corresponding quantized vectors/values for the symbols, thereby producing the original quantized network parameters.

VI. Experimental/Simulation Results for Vector Quantization

The well-known dataset CIFAR40 was used in the simulations. CIFAR-10 is a labeled subset of a larger dataset of 80 million tiny images collected by Alex Krizhevsky, Vinod Nair, and Geoffrey Hinton. The CIFAR-10 subset consists of 60,000 32×32 color images in 10 different classes/categories, with 6000 images per class. There are 50,000 training images and 10,000 test images. ResNet is a state-of-the-art deep convolutional neural network for image classification described in He et al. 2015. The depth of the neural network increased while identity paths were added for better convergence. The result was a pre-trained 32-layer ResNet, which had a total number of network parameters of 464,154 and achieved 92.58% accuracy for the CIFAR 10 data set.

The lattice quantization and universal quantization schemes described herein were evaluated with the 32-layer ResNet. In particular, two cases were tested, where the uniform boundaries in each dimension were set by $$\left[\pm \frac{1}{2}\Delta, \pm \frac{3}{2}\Delta, \ldots, \pm \frac{2i+1}{2}\Delta, \ldots\right]$$

and $[0, \pm\Delta, \pm 2\Delta, \ldots \pm i\Delta, \ldots]$, respectively. The quantization step size was the same in the two cases, but the first one had the origin in the middle of a cluster while the second one had the origin on the boundary of the clusters, Huffman coding was used for source coding after quantization.

A high volume of network parameters concentrated around zero and thus it was more efficient in compression to locate the origin in the middle of cluster, as in the first test, as shown in the following drawings.

FIG. 13A illustrates exemplary plots of accuracy for various lattice quantizations vs. their compression ratios before fine-tuning, white FIG. 13B illustrates exemplary plots of accuracy for various lattice quantizations vs. their compression ratios after fine-tuning the quantized vectors, where the uniform boundaries were set in each dimension by $$\left[ \pm \frac{1}{2}\Delta, \pm \frac{3}{2}\Delta, \ldots, \pm \frac{2i+1}{2}\Delta, \ldots \right].$$

FIG. 13C illustrates exemplary plots of accuracy for various lattice quantizations vs. their compression ratios before fine-tuning, while FIG. 13D illustrates exemplary plots of accuracy for various lattice quantizations vs. their compression ratios after fine-tuning the quantized vectors where the uniform boundaries were set in each dimension by [0, ±Δ, ±2Δ, ..., ±iΔ, ...].

FIG. 14A illustrates exemplary plots of accuracy for various universal quantizations vs their compression ratios before fine-tuning, while FIG. 13B illustrates exemplary plots of accuracy for various universal quantizations vs. their compression ratios after fine-tuning the quantized vectors where the uniform boundaries were set in each dimension by $$\left[ \pm \frac{1}{2}\Delta, \pm \frac{3}{2}\Delta, \ldots, \pm \frac{2i+1}{2}\Delta, \ldots \right].$$

FIG. 14C illustrates exemplary plots of accuracy for various universal quantizations vs. their compression ratios before fine-tuning, while FIG. 14D illustrates exemplary plots of accuracy for various universal quantizations vs. their compression ratios after fine-tuning the quantized vectors where the uniform boundaries were set in each dimension by [0, ±Δ, ±2Δ, ..., ±iΔ, ...].

Figure 15:
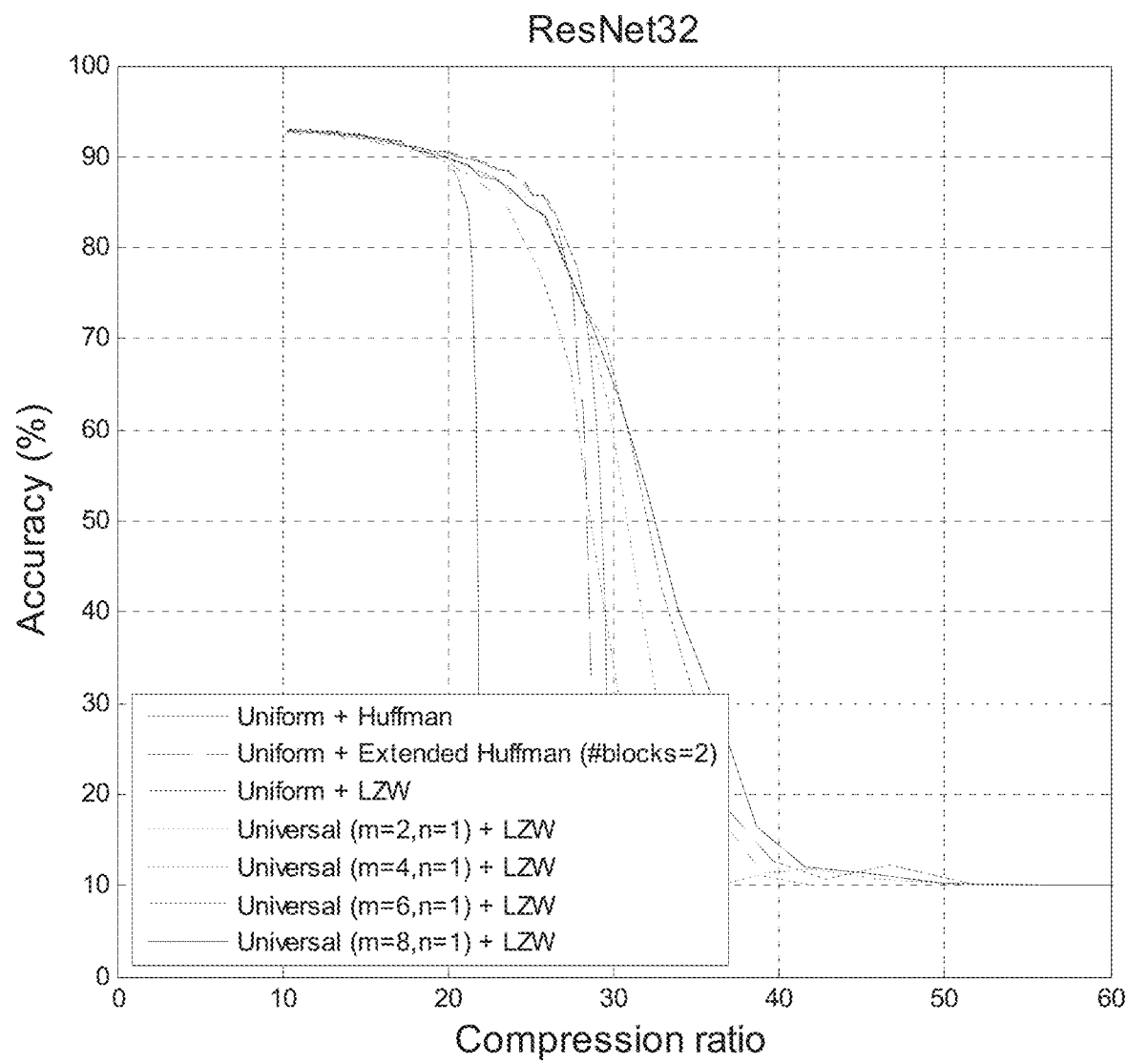
FIG. 15 illustrates exemplary plots of accuracy vs. compression ratio for both uniform and universal quantizations using various coding schemes, according to various embodiments of the present disclosure.

FIG. 15 illustrates exemplary plots of accuracy vs. compression ratio for both uniform and universal quantizations using various coding schemes, according to various embodiments of the present disclosure.

VII. Conclusions Regarding Vector Quantization

In the section above regarding vector quantization, ECSQ solutions are generalized to vector quantization (i.e., ECVQ). Moreover, a simple lattice quantizer, i.e., the multi-dimensional uniform quantizer, which is not only simple to implement but also shows good performance in experiments/simulations, is provided. For achieving good performance within a guaranteed bound from the entropy rate for any source distribution, a method and system for randomizing source symbols with a uniformly distributed dither, i.e., universal quantization, is also provided. Combining universal quantization with universal source coding, a universal network compression system and method is disclosed, which may perform near optimally for any neural networks and any compression ratio constraints.

In alternative embodiments, instead of multi-dimensional uniform quantization, other lattice quantizers may be employed, where the Voronoi cells may be some other type of n-dimensional polytopes (i.e., a polytope is a convex region in the n-dimensional Euclidean space enclosed by a finite number of hyperplanes). See, e.g., Conway, J. and Sloane, N., "Voronoi regions of lattices, second moments of polytopes, and quantization," IEEE Transactions on Information Theory, vol. 28, no. 2, pp. 211-226, 1982 ("Conway & Sloane 1982a"); and Conway, J. and Sloane, N., "Fast quantizing and decoding and algorithms for lattice quantizers and codes," IEEE Transactions on Information Theory, vol. 28, no. 2, pp. 227-232, 1982 ("Conway & Sloane 1982b"). For example, in the three-dimensional case, the lattice can have the shape of an octahedron, a hexagonal prism, a rhombic dodecahedron, and so on. Some lattices are more efficient than the others, and Conway & Sloane 1982a and Conway & Sloane 1932b have determined the most efficient lattice quantizers for some values of dimension n.

Although the multi-dimensional uniform quantizer is not necessarily the most efficient lattice quantizer, it is described herein as it is simple to implement for any value of dimension n. However, as would be understood by one of ordinary skill in the art, the present disclosure regarding vector/universal quantization is not limited to the specific multi-dimensional uniform quantizer embodiment described herein, or limited to any of the other specific quantizer embodiments described herein. In other embodiments, Hessian-weighting is still applicable in vector quantization and universal quantization. In particular, when computing cluster centers, a Hessian-weighted mean can be used instead of a non-weighted regular mean.

Figure 16:
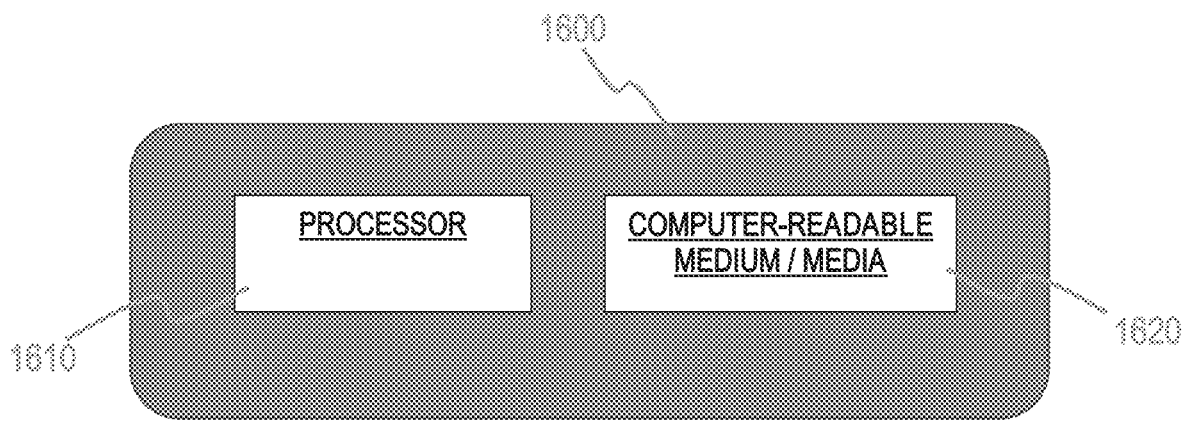
FIG. 16 illustrates an exemplary diagram of the present apparatus, according to one embodiment.

FIG. 16 illustrates an exemplary diagram of the present apparatus, according to one embodiment. An apparatus 1600 includes at least one processor 1610 and one or more non-transitory computer readable media 1620. The at least one processor 1610, when executing instructions stored on the one or more non-transitory computer readable media 1620, performs the steps of constructing multi-dimensional vectors representing network parameters from a trained neural network model; quantizing the multi-dimensional vectors to obtain shared quantized vectors as cluster centers; fine-tuning the shared quantized vectors/cluster centers; and encoding using the shared quantized vectors/cluster centers. Moreover, the one or more non-transitory computer-readable media 1620 stores instructions for the at least one processor 1610 to perform those steps.

Figure 17:
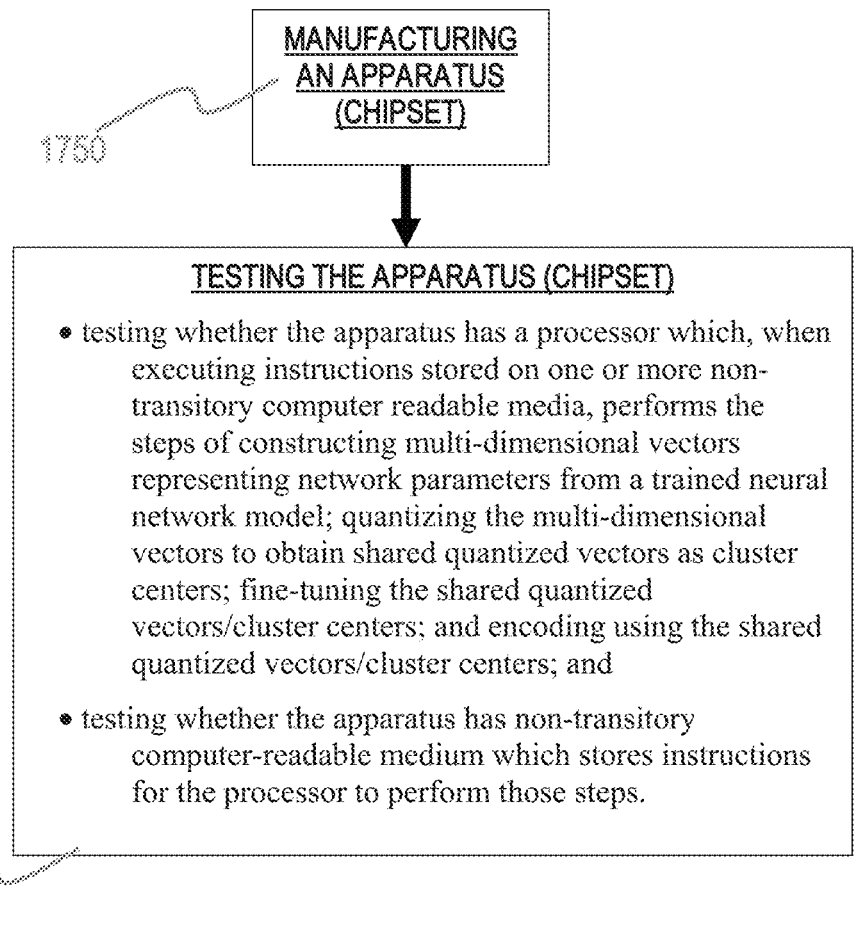
FIG. 17 illustrates an exemplary flowchart for manufacturing and testing the present apparatus, according to one embodiment.

FIG. 17 illustrates an exemplary flowchart for manufacturing and testing the present apparatus, according to one embodiment.

At 1750, the apparatus (in this instance, a chipset) is manufactured, including at least one processor and one or more non-transitory computer-readable media. When executing instructions stored on the one or more non-transitory computer readable media, the at least one processor performs the steps of constructing multi-dimensional vectors representing network parameters from a trained neural network model; quantizing the multi-dimensional vectors to obtain shared quantized vectors as cluster centers; fine-tuning the shared quantized vectors/cluster centers; and encoding using the shared quantized vectors/cluster centers. The one or more non-transitory computer-readable media store instructions for the at least one processor to perform those steps.

At 1760, the apparatus (in this instance, a chipset) is tested. Testing 1760 includes testing whether the apparatus has at least one processor which, when executing instructions stored on one or more non-transitory computer readable media, performs the steps of constructing multi-dimensional vectors representing network parameters from a trained neural network model; quantizing the multi-dimensional vectors to obtain shared quantized vectors as cluster centers; fine-timing the shared quantized vectors/cluster centers; and encoding using the shared quantized vectors/cluster centers; and testing whether the apparatus has the one or more non-transitory computer-readable media which store instructions for the at least one processor to perform the above steps.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings may not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., a hard disk, a memory, a computer network or cellular wireless network or other data transmission medium, or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method for network quantization using multi-dimensional vectors, comprising:
   constructing multi-dimensional vectors representing network parameters from a trained neural network model;
   quantizing the multi-dimensional vectors to obtain shared quantized vectors as cluster centers;
   individually fine-tuning each dimensional element of each of the shared quantized vectors/cluster centers with a stochastic gradient descent method using an average gradient of a network loss function for a respective divided group of the network parameters corresponding to the dimensional element; and
   encoding using the shared quantized vectors/cluster centers.

2. The method of claim 1, wherein encoding comprises:
   creating binary codewords using entropy coding on the shared quantized vectors/cluster centers.

3. The method of claim 1, wherein quantizing the multi-dimensional vectors comprises:
   using lattice quantization to quantize the multi-dimensional vectors.

4. The method of claim 1, wherein quantizing the multi-dimensional vectors comprises:
   using an iterative algorithm to solve an entropy-constrained vector quantization.

5. The method of claim 1, wherein quantizing the multi-dimensional vectors comprises:
   using universal quantization to quantize the multi-dimensional vectors.

6. The method of claim 5, further comprising:
   randomizing the network parameters using dithering before quantizing.

7. The method of claim 6, wherein randomizing the network parameters using dithering comprises:
using a pseudo-random number generator to generate random dithering values.

8. The method of claim 1, wherein quantizing the multi-dimensional vectors comprises:
converting the quantized vectors into symbols.

9. The method of claim 8, wherein converting the quantized vectors into symbols comprises:
using a lookup table to find symbols corresponding to the quantized vectors.

10. The method of claim 8, wherein encoding comprises:
using universal coding.

11. An apparatus, comprising:
one or more non-transitory computer-readable media; and
at least one processor which, when executing instructions stored on one or more non-transitory computer readable media, performs the steps of:
constructing multi-dimensional vectors representing network parameters from a trained neural network model;
quantizing the multi-dimensional vectors to obtain shared quantized vectors as cluster centers;
individually fine-tuning each dimensional element of each of the shared quantized vectors/cluster centers with a stochastic gradient descent method using an average gradient of a network loss function for a respective divided group of the network parameters corresponding to the dimensional element; and
encoding using the shared quantized vectors/cluster centers.

12. The apparatus of claim 11, wherein the at least one processor performs encoding by:
creating binary codewords using entropy coding on the shared quantized vectors/cluster centers.

13. The apparatus of claim 11, wherein the at least one processor performs quantizing the multi-dimensional vectors by at least:
using lattice quantization to quantize the multi-dimensional vectors.

14. The apparatus of claim 11, wherein the at least one processor performs quantizing the multi-dimensional vectors by:
using an iterative algorithm to solve an entropy-constrained vector quantization.

15. The apparatus of claim 11, wherein the at least one processor performs quantizing the multi-dimensional vectors by:
using universal quantization to quantize the multi-dimensional vectors.

16. The apparatus of claim 11, wherein the at least one processor further performs the step of:
randomizing the network parameters using dithering before quantizing.

17. The apparatus of claim 16, wherein the at least one processor performs randomizing the network parameters using dithering by:
using a pseudo-random number generator to generate random dithering values.

18. The apparatus of claim 16, wherein the at least one processor performs converting the quantized vectors into symbols by:
using a lookup table to find symbols corresponding to the quantized vectors.

19. A method, comprising:
manufacturing a chipset comprising:
at least one processor which, when executing instructions stored on one or more non-transitory computer readable media, performs the steps of:
constructing multi-dimensional vectors representing network parameters from a trained neural network model;
quantizing the multi-dimensional vectors to obtain shared quantized vectors as cluster centers;
individually fine-tuning each dimensional element of each of the shared quantized vectors/cluster centers with a stochastic gradient descent method using an average gradient of a network loss function for a respective divided group of the network parameters corresponding to the dimensional element; and
encoding using the shared quantized vectors/cluster centers; and
the one or more non-transitory computer-readable media which store the instructions.

20. A method of testing an apparatus, comprising:
testing whether the apparatus has at least one processor which, when executing instructions stored on one or more non-transitory computer readable media, performs the steps of:
constructing multi-dimensional vectors representing network parameters from a trained neural network model;
quantizing the multi-dimensional vectors to obtain shared quantized vectors as cluster centers;
individually fine-tuning each dimensional element of each of the shared quantized vectors/cluster centers with a stochastic gradient descent method using an average gradient of a network loss function for a respective divided group of the network parameters corresponding to the dimensional element; and
encoding using the shared quantized vectors/cluster centers; and
testing whether the apparatus has the one or more non-transitory computer-readable media which store the instructions.

* * * * *